(12) United States Patent
Nagasaka

(10) Patent No.: US 7,769,092 B2
(45) Date of Patent: *Aug. 3, 2010

(54) ULTRA WIDEBAND RADIO TRANSMITTER, ULTRA WIDEBAND RADIO RECEIVER, AND ULTRA WIDEBAND RADIO COMMUNICATION METHOD

(75) Inventor: Hiroyuki Nagasaka, Kanagawa (JP)

(73) Assignee: Samsung Electronics, Co., Ltd., Suwon-si (KR)

( * ) Notice: Subject to any disclaimer, the term of this patent is extended or adjusted under 35 U.S.C. 154(b) by 1033 days.

This patent is subject to a terminal disclaimer.

(21) Appl. No.: 10/534,143

(22) PCT Filed: Nov. 21, 2003

(86) PCT No.: PCT/KR03/02530

§ 371 (c)(1),
(2), (4) Date: Jun. 21, 2006

(87) PCT Pub. No.: WO2004/047320

PCT Pub. Date: Jun. 3, 2004

(65) Prior Publication Data

US 2006/0234761 A1    Oct. 19, 2006

(30) Foreign Application Priority Data

Nov. 21, 2002    (JP)    .............................. 2002-338204

(51) Int. Cl.
  *H04L 27/28*    (2006.01)
(52) U.S. Cl. ...................................... 375/260; 375/295
(58) Field of Classification Search ................... 375/295
See application file for complete search history.

(56) References Cited

U.S. PATENT DOCUMENTS 5,533,010 A * 7/1996 Tanaka ........................ 455/464

(Continued)

FOREIGN PATENT DOCUMENTS

JP    09-116625    5/1997

(Continued)

OTHER PUBLICATIONS

Kelland, Ultra-Wideband Wireless Technology, 2002.

(Continued)

*Primary Examiner*—Chieh M Fan
*Assistant Examiner*—Santiago Garcia
(74) *Attorney, Agent, or Firm*—NSIP Law

(57) ABSTRACT

Disclosed are ultra wideband radio transmitter, ultra wideband radio receiver, and ultra wideband radio communication method capable of securing higher transfer rate and communication quality than conventional ones while avoiding a band where communication signals are concentrated, and capable of miniaturizing an antenna. In a transmitter, a delay time controller (12) outputs a periodic pulse to matched filters 11-1 and 11-2 when transmission data is 1, and outputs the periodic pulse to matched filters 11-1 and 11-3 when the transmission data is 0. The matched filter 11-1 outputs reference signal, the matched filter 11-2 outputs first data signal ahead of the reference signal, and the matched filter 11-3 outputs second data signal behind the reference signal. An adder (13) adds up these, a mixer (21) frequency-converts output of the adder using a local signal received from a local oscillator (23), and an antenna (6) radiates output of the mixer (21).

9 Claims, 28 Drawing Sheets

U.S. PATENT DOCUMENTS

| | | | |
|---|---|---|---|
| 6,571,089 B1 * | 5/2003 | Richards et al. | 455/266 |
| 7,065,162 B1 * | 6/2006 | Sorrells et al. | 375/343 |
| 7,260,369 B2 * | 8/2007 | Feher | 455/133 |
| 7,352,806 B2 * | 4/2008 | Lakkis | 375/237 |
| 7,397,870 B2 * | 7/2008 | Batra et al. | 375/340 |
| 2002/0061081 A1 * | 5/2002 | Richards et al. | 375/346 |
| 2003/0161411 A1 * | 8/2003 | McCorkle et al. | 375/295 |
| 2003/0186670 A1 * | 10/2003 | Sorrells et al. | 455/323 |
| 2003/0227984 A1 * | 12/2003 | Batra et al. | 375/340 |

FOREIGN PATENT DOCUMENTS

| | | |
|---|---|---|
| JP | 10-107684 | 4/1998 |
| JP | 2002-335168 | 11/2002 |
| JP | 2003-101509 | 4/2003 |
| JP | 2003-152594 | 5/2003 |
| JP | 2004-072589 | 3/2004 |
| JP | 2004-104403 | 4/2004 |
| WO | WO 0173965 | 10/2001 |

OTHER PUBLICATIONS

Foerster et al., Ultra-Wideband Technology for Short- or Medium-Range Wireless Communications, 2001.

* cited by examiner

| Q1 | Q2 | DATA |
|---|---|---|
| 0 | 0 | X |
| 0 | 1 | 1 |
| 1 | 0 | 0 |
| 1 | 1 | X |

FIG.14

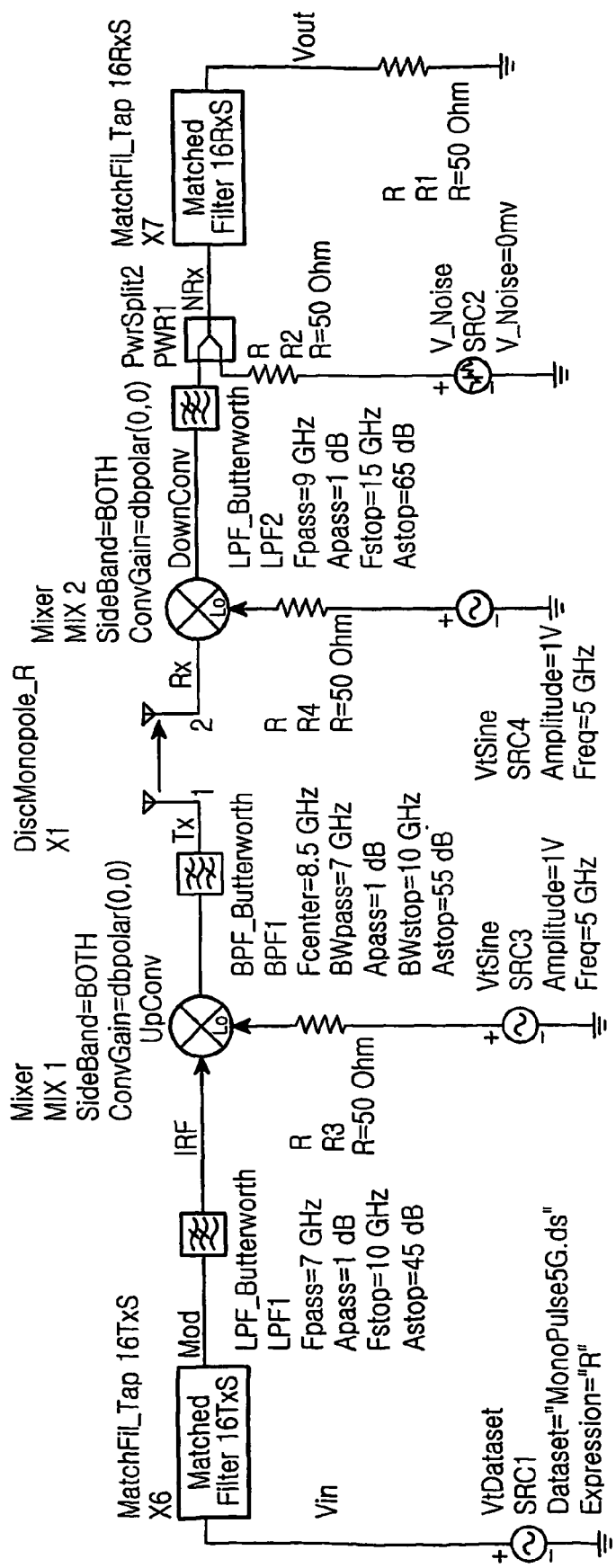

FIG.19

LPF1: IMAGE REJECTION FILTER FOR PREVENTING RESTORATION AFTER UP-CONVERSION
MIX1+SRC3: UP CONVERTER (LOCAL OSCILLATOR FREQUENCY=5GHZ, CONVERSION LOSS=0dB)
BPF1: BAND PASS FILTER FOR PICKING OUT ONLY UPPER SIDE BAND
MIX2+SRC4: DOWN CONVERTER (LOCAL OSCILLATOR FREQUENCY=5GHZ, CONVERSION LOSS=0dB)
LPF2: LOW PASS FILTER FOR PICKING OUT ONLY LOWER SIDE BAND
PWR1+SRC2: NOISE ADDER (V_NOISE=0mV→UNUSED)

ULTRA WIDEBAND RADIO TRANSMITTER, ULTRA WIDEBAND RADIO RECEIVER, AND ULTRA WIDEBAND RADIO COMMUNICATION METHOD

FIELD OF THE INVENTION

The present invention relates generally to an ultra wideband radio transmitter, an ultra wideband radio receiver and an ultra wideband radio communication method using an ultra wideband used in connecting a PDA (Personal Digital Assistant), a portable phone and a peripheral device in a wireless LAN (Local Area Network) or PAN (Personal Area Network).

DESCRIPTION OF THE RELATED ART

An ultra wideband radio communication scheme that spreads data over a very wide frequency band of about 1 GHz and overlays the data on a pulse without using a carrier during transmission and reception attracts public attention as a new data communication scheme for spread spectrum communication [see Non-patent Reference 1].

Since data transmitted at each frequency band has as low power as noises, the ultra wideband radio communication scheme is advantageous in that it does not interfere with a radio apparatus using the same frequency band and has low power consumption as well.

Existing technology applied to the ultra wideband radio communication scheme is disclosed in Patent Reference 1. According to this method, as illustrated in FIG. 31, in a transmitter, a delay time controller 2 generates a pulse based on a transmission data signal, and outputs output signals K1 to K3 to matched filters 1-1 to 1-3 of FIG. 4, respectively.

The matched filter 1-1 receiving the output signal K1 outputs a reference signal that becomes a data decision criterion. The matched filter 1-2 receiving the output signal K2 outputs a data signal a predetermined time ahead of the reference signal, and the matched filter 1-3 receiving the output signal K3 outputs a data signal a predetermined time behind the reference signal. An adder 3 adds up outputs of the matched filters 1-1 to 1-3, a PA (Power Amplifier) 4 amplifies an output of the adder 3, and an antenna 6 radiates an output of the PA 4 via a switch 5.

In a receiver, the antenna 6 receives a signal, and outputs the received signal to matched filters 8-1 and 8-2 of FIG. 7. When the matched filter 8-1 detects a reference signal and the matched filter 8-2 detects a data signal, they output signals S1 and S2, respectively. A delay time measurer 9 determines which of the output signals S1 and S2 was received first, and a data decider 10 demodulates a data signal based on the detection result.

According to this technology, since the ultra wideband radio communication scheme does not require a digital circuit for high-speed modulation/demodulation, it is possible to implement ultra wideband radio communication with a low-speed digital circuit having low power consumption, thereby suppressing multipath influence.

Patent Reference 1
Japanese Patent Application No. 2002-262680

Non-Patent Reference 1
Characteristic Evaluation of Internally Turbo-Coded Ultra Wideband-Impulse Radio (ITU-UWB-IR) Scheme, Technical Report of IEIGE, pp. 25-30 RCS 2002-55 (2002-05)

SUMMARY OF THE INVENTION

A UWB spectrum allocated in an existing ultra wideband radio communication scheme is introduced into FIG. 30. As illustrated in FIG. 30, the existing ultra wideband radio communication scheme performs communication using a bandwidth of 3.1 GHz to 10.6 GHz (for example, 3.5 GHz to 7 GHz). However, a 5 GHz band is a band where recently, frequently-used WLANs (wireless Local Area Networks) are densely concentrated.

It is known that since a signal level of the WLAN is very higher than that of a UWB signal, this becomes the cause of interference to UWB communication, causing deterioration of BER (Bit Error Rate) during communication. Therefore, when communication is performed in a frequency band including the 5 GHz band, it is not possible to obtain a theoretical transfer rate undesirably. In addition, an antenna for such a wideband signal is inevitably theoretically increased in size.

The present invention has been made under these circumstances, and it is therefore an object of the present invention to provide an ultra wideband radio transmitter, an ultra wideband radio receiver and an ultra wideband radio communication method capable of securing higher transfer rate and communication quality than conventional ones while avoiding a band where communication signals are densely concentrated, and also capable of miniaturizing an antenna.

The present invention has been made to solve the above-mentioned problems, and the invention defined in claim 1 is characterized by providing an ultra wideband radio transmitter comprising a delay time controller for generating a periodic pulse, inputting the periodic pulse to a first matched filter, outputting the periodic pulse to a second matched filter when transmission data has a first level out of 2 logical levels, outputting the periodic pulse to a third matched filter when the transmission data has a second level out of the 2 logical levels; the first matched filter for outputting a reference signal that becomes a data decision criterion when the periodic pulse is input thereto; the second matched filter for outputting a first data signal a predetermined time ahead of the reference signal when the periodic pulse is input thereto; the third matched filter for outputting a second data signal a predetermined time behind the reference signal when the periodic pulse is input thereto; an adder for adding up outputs of the first to third matched filters; a local oscillator for outputting a local signal for frequency-converting a corresponding addition signal at a high frequency band or a low frequency band; a mixer for receiving the addition signal and the local signal, and frequency-converting the corresponding addition signal; and an antenna for receiving the frequency-converted addition signal and radiating the corresponding signal in the air.

The invention defined in claim 2 is characterized in that the reference signal, the first data signal and the second data signal each are a pattern signal comprised of several periodic pulses.

The invention defined in claim 3 is characterized by providing an ultra wideband radio receiver comprising an antenna for receiving a radio wave signal; a local oscillator for outputting a local signal for frequency-converting the radio wave signal; a mixer for receiving the radio wave signal and the local signal, and frequency-converting the radio wave signal; a first matched filter for receiving the frequency-converted radio wave signal, and outputting a first output signal when a reference signal that becomes a data decision criterion is detected therefrom; a second matched filter for receiving the frequency-converted radio wave signal, and outputting a second output signal when a data signal is detected therefrom; a delay time measurer for detecting which of the first output signal and the second output signal has been first output from the first and second matched filters, and outputting a corresponding detection result; and a data decider for receiving the detection result and deciding whether the data signal has a first level or a second level out of 2 logical levels.

The invention defined in claim 4 is characterized in that the reference signal and the data signal each are a pattern signal comprised of several periodic pulses.

The invention defined in claim 5 is characterized in that the delay time measurer of claim 3 comprises a first circuit for receiving the first output signal and calculating a square value or an absolute value of the corresponding signal; and a second circuit for receiving the second output signal and calculating a square value or an absolute value of the corresponding signal.

The invention defined in claim 6 is characterized in that the delay time measurer of claim 5 further comprises a first latch for receiving and setting the first output signal; a second latch for receiving and setting the second output signal; a first memory for reading the second output signal by receiving the first output signal; a second memory for reading the first output signal by receiving the second output signal; and a reset section for outputting a reset signal by receiving outputs of the first or second latch.

The invention defined in claim 7 is characterized by providing an ultra wideband radio transmitter including a first radio section for performing data communication using a first frequency, a second radio section for performing data communication using a second frequency being different from the first frequency, and an interface section for allocating transmission data to the first and second radio sections, comprising: the first radio section including; a first delay time controller for generating a periodic pulse by receiving transmission data allocated by the interface, inputting the periodic pulse to a first matched filter, outputting the periodic pulse to a second matched filter when the transmission data has a first level out of 2 logical levels, and outputting the periodic pulse to a third matched filter when the transmission data has a second level out of the 2 logical levels; the first matched filter for outputting a reference signal that becomes a data decision criterion when the periodic pulse is input thereto; the second matched filter for outputting a first data signal a predetermined time ahead of the reference signal when the periodic signal is input thereto; the third matched filter for outputting a second data signal a predetermined time behind the reference signal when the periodic pulse is input thereto; a first adder for adding up outputs of the first to third matched filters; and a first antenna for receiving a corresponding addition signal and radiating the addition signal in the air; and the second radio section including; a second delay time controller for generating a periodic pulse by receiving transmission data allocated by the interface, inputting the periodic pulse to a third matched filter, outputting the periodic pulse to a fourth matched filter when the transmission data has a first level out of 2 logical levels, and outputting the periodic pulse to a fifth matched filter when the transmission data has a second level out of the 2 logical levels; the third matched filter for outputting a reference signal that becomes a data decision criterion when the periodic pulse is input thereto; the fourth matched filter for outputting a first data signal a predetermined time ahead of the reference signal when the periodic signal is input thereto; the fifth matched filter for outputting a second data signal a predetermined time behind the reference signal when the periodic pulse is input thereto; a second adder for adding up outputs of the third to fifth matched filters; a local oscillator for outputting a local signal for frequency-converting a corresponding addition signal from the first frequency to the second frequency; a mixer for receiving the addition signal and the local signal, and frequency-converting the addition signal; and an antenna for receiving the frequency-converted addition signal and radiating the corresponding signal in the air.

The invention defined in claim 8 is characterized by providing an ultra wideband radio receiver including a first radio section for performing data communication using a first frequency and a second radio section for performing data communication using a second frequency being different from the first frequency, comprising: a first antenna for receiving a radio wave signal and outputting the received radio wave signal to a first matched filter and a second matched filter; the first matched filter for receiving a signal from the first antenna, and outputting a first output signal when a reference signal that becomes a data decision criterion is detected therefrom; the second matched filter for receiving a signal from the first antenna, and outputting a second output signal when a data signal is detected therefrom; a first delay time measurer for detecting which of the first output signal and the second output signal has been first output from the first and second matched filters, and outputting a corresponding detecting result; and a first data decider for receiving the detection result, and deciding whether the data signal has a first level or a second level out of 2 logical levels; and the second radio section including; a second antenna for receiving a radio wave signal; a local oscillator for outputting a local signal for frequency-converting the radio wave signal; a mixer for receiving the radio wave signal and the local signal, and frequency-converting the radio wave signal; a third matched filter for receiving the frequency-converted radio wave signal, and outputting the first output signal when a reference signal that becomes a data decision criterion is detected therefrom; a fourth matched filter for receiving the frequency-converted radio wave signal, and outputting the second output signal when a data signal is detected therefrom; a second delay time measurer for detecting which of the first output signal and the second output signal has first been output from the third and fourth matched filters, and outputting a corresponding detection result; and a second data decider for receiving the detecting result, and deciding whether the data signal has a first level or a second level out of 2 logical levels.

The invention defined in claim 9 is characterized by providing an ultra wideband radio transmitter including a first radio section for performing data communication using a first frequency, a second radio section for performing data communication using a second frequency being different from the first frequency, and an interface for allocating transmission data to the first and second radio sections, comprising: the first radio section including; a first delay time controller for generating a periodic pulse by receiving transmission data allocated by the interface, inputting the periodic pulse to a first matched filter, outputting the periodic pulse to a second matched filter when the transmission data has a first level out of 2 logical levels, and outputting the periodic pulse to a third matched filter when the transmission data has a second level of the 2 logical levels; the first matched filter for outputting a reference signal that becomes a data decision criterion when the periodic pulse is input thereto; the second matched filter for outputting a first data signal a predetermined time ahead of the reference signal when the periodic pulse is input thereto;

the third matched filter for outputting a second data signal a predetermined time behind the reference signal when the periodic pulse is input thereto; a first adder for adding up outputs of the first to third matched filters; and a first antenna for receiving a corresponding addition signal, and radiating the addition signal in the air; and the second radio section including; a second delay time controller for generating a periodic pulse by receiving transmission data allocated by the interface, inputting the periodic pulse to a third matched filter, outputting the periodic pulse to a fourth matched filter when the transmission data has a first level out of 2 logical levels, and outputting the periodic pulse to a fifth matched filter when the transmission data has a second level of the 2 logical levels; the third matched filter for outputting a reference signal that becomes a data decision criterion when the periodic pulse is input thereto; the fourth matched filter for outputting a first data signal a predetermined time ahead of the reference signal when the periodic pulse is input thereto; the fifth matched filter for outputting a second data signal a predetermined time behind the reference signal when the periodic pulse is input thereto; a second adder for adding up outputs of the third to fifth matched filters; a local oscillator for outputting a local signal for frequency-converting a corresponding addition signal from the first frequency to the second frequency; and a mixer for receiving the addition signal and the local signal, frequency-converting the addition signal, and outputting the frequency-converted addition signal to the first antenna.

The invention defined in claim 10 is characterized by providing an ultra wideband radio receiver including a first radio section for performing data communication using a first frequency and a second radio section for performing data communication using a second frequency being different from the first frequency, comprising: a first antenna for receiving a radio wave signal and outputting the received radio wave signal to a first matched filter, a second matched filter, and a mixer in the second radio section; the first matched filter for receiving a signal from the first antenna, and outputting a first output signal when a reference signal that becomes a data decision criterion is detected therefrom; the second matched filter for receiving a signal from the first antenna, and outputting a second output signal when a data signal is detected therefrom; a first delay time measurer for detecting which of the first output signal and the second output signal has been first output from the first and second matched filters, and outputting a corresponding detecting result; and a first data decider for receiving the detection result, and deciding whether the data signal has a first level or a second level out of 2 logical levels; and the second radio section including; a local oscillator for outputting a local signal for frequency-converting a radio wave signal received from the first antenna; a mixer for receiving the radio wave signal from the first antenna and the local signal, and frequency-converting the radio wave signal; a third matched filter for receiving the frequency-converted radio wave signal, and outputting the first output signal when a reference signal that becomes a data decision criterion is detected therefrom; a fourth matched filter for receiving the frequency-converted radio wave signal, and outputting the second output signal when a data signal is detected therefrom; a second delay time measurer for detecting which of the first output signal and the second output signal has first been output from the third and fourth matched filters, and outputting a corresponding detection result; and a second data decider for receiving the detecting result, and deciding whether the data signal has a first level or a second level out of 2 logical levels.

The invention defined in claim 11 is characterized by providing an ultra wideband radio communication method characterized in that in an ultra wideband radio transmitter, a delay time controller generates a periodic pulse, inputs the periodic pulse to a first matched filter, outputs the periodic pulse to a second matched filter when transmission data has a first level out of 2 logical levels, and outputs the periodic pulse to a third matched filter when the transmission data has a second level out of 2 logical levels; the first matched filter outputs a reference signal that becomes a data decision criterion when the periodic pulse is input thereto; the second matched filter outputs a first data signal a predetermined time ahead of the reference signal when the periodic pulse is input thereto; the third matched filter outputs a second data signal a predetermined time behind the reference signal when the periodic pulse is input thereto; an adder adds up outputs of the first to third matched filters; a local oscillator outputs a local signal for frequency-converting a corresponding addition signal at a high frequency band or a low frequency band; a mixer receives the addition signal and the local signal, and frequency-converts the addition signal; and an antenna receives the frequency-converted addition signal, and radiates the corresponding signal in the air; in an ultra wideband radio receiver, an antenna receives the addition signal and outputs the corresponding signal to a mixer; the mixer receives the addition signal and a local signal that a local oscillator outputs to frequency-convert the addition signal, and frequency-converts the addition signal; a fourth matched filter receives the frequency-converted radio wave signal, and outputs a first output signal when a reference signal that becomes a data decision criterion is detected therefrom; a fifth matched filter receives the frequency-converted radio wave signal, and outputs a second output signal when a data signal is detected therefrom; a delay time measurer detects which of the first output signal and the second output signal has been first output from the fourth and fifth matched filters, and outputs a corresponding detection result; and a data decider receives the detection result, and decides whether the data signal has a first level or a second level out of 2 logical levels.

BRIEF DESCRIPTION OF THE DRAWINGS

FIG. 14 illustrates a data decision table with which the data deciders 10 and 20 decide data;

FIG. 19 is a diagram illustrating a simulation structure of an ultra wideband radio transceiver according to an embodiment of the present invention;

DETAILED DESCRIPTION OF THE PREFERRED EMBODIMENTS

A first embodiment of an ultra wideband radio transceiver according to the present invention will now be described with reference to the accompanying drawings.

Figure 1:
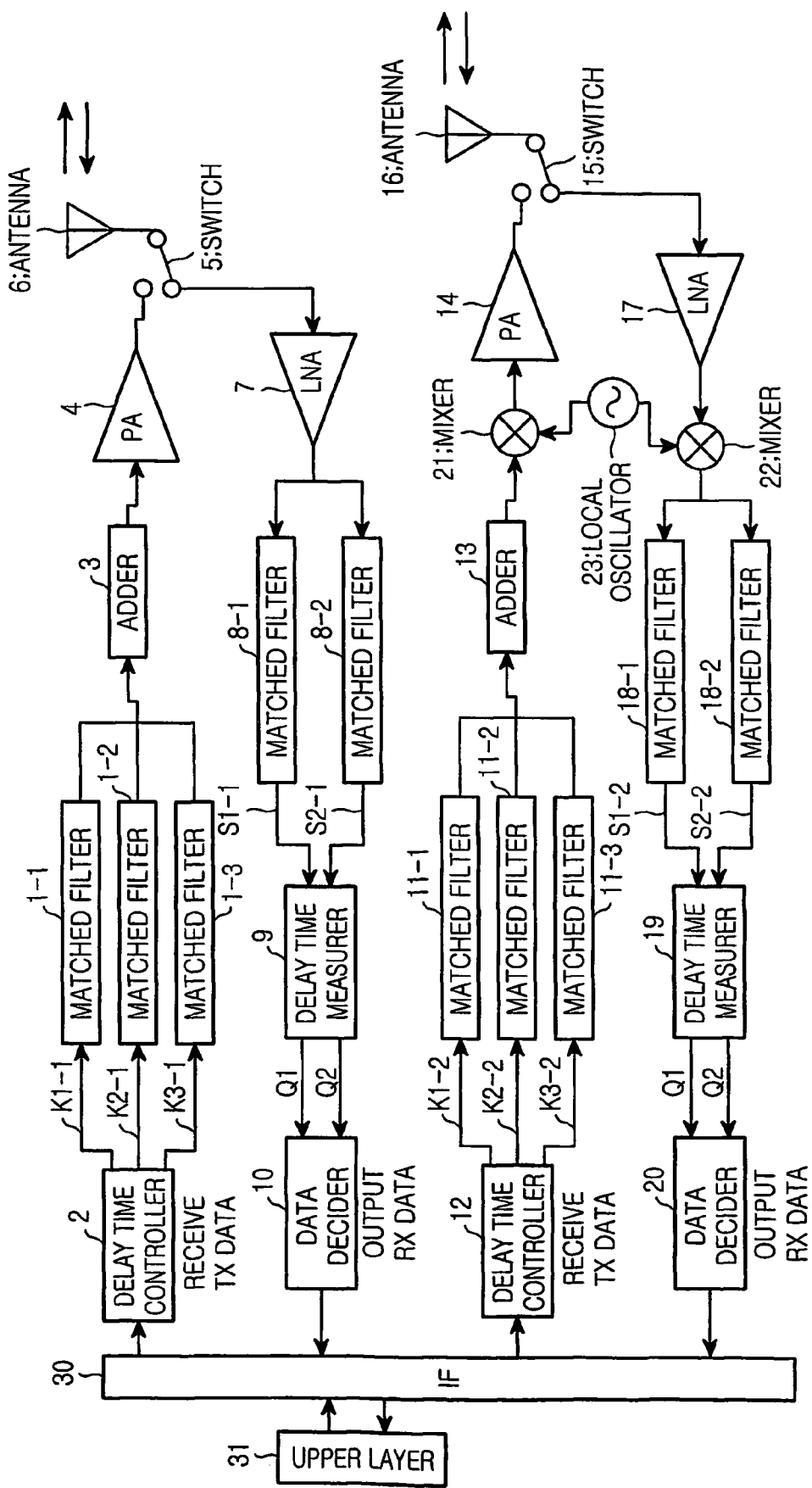
FIG. 1 is a diagram illustrating a structure of an ultra wideband radio transceiver according to a first embodiment of the present invention.

FIG. 1 is a diagram illustrating a structure of an ultra wideband radio transceiver according to an embodiment of the present invention. An ultra wideband radio transceiver according to this embodiment is comprised of first and second transmitters, first and second receivers, an interface (IF) 30, and an upper layer 31.

The first transmitter is comprised of matched filters 1-1 to 1-3, a delay time controller 2, an adder 3, a power amplifier (hereinafter referred to as "FA") 4, a switch 5, and an antenna 6.

The first receiver is comprised of the switch 5 (shared with the first transmitter), the antenna 6 (also shared with the first transmitter), a low-noise amplifier (hereinafter referred to as "LNA") 7, matched filters 8-1 and 8-2, a delay time measurer 9, and a data decider 10.

The second transmitter is formed by installing a mixer 21 and a local oscillator 23 in the first transmitter. That is, the second transmitter is comprised of matched filters 11-1 to 11-3, a delay time controller 12, an adder 13, a mixer 21, a local oscillator 23, a PA 14, a switch 15, and an antenna 16.

The second receiver is formed by installing a mixer 22 and the local oscillator 23 (shared with the second transmitter) in the first receiver. That is, the second receiver is comprised of the switch 15 (shared with the second transmitter), the antenna 16 (also shared with the second transmitter), an LNA 17, a mixer 22, the local oscillator 23, matched filters 18-1 and 18-2, a delay time measurer 19, and a data decider 20.

Figure 2:
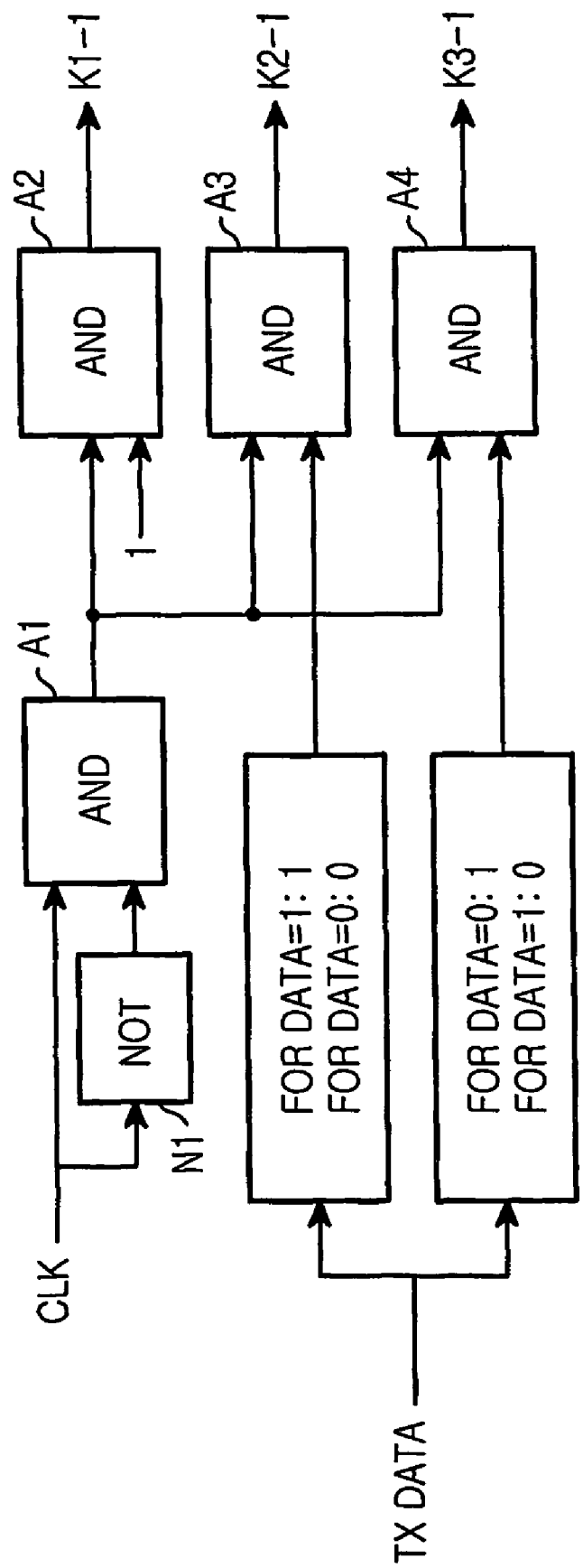
FIG. 2 is a diagram illustrating a structure of the delay time controller 2.
Figure 3:
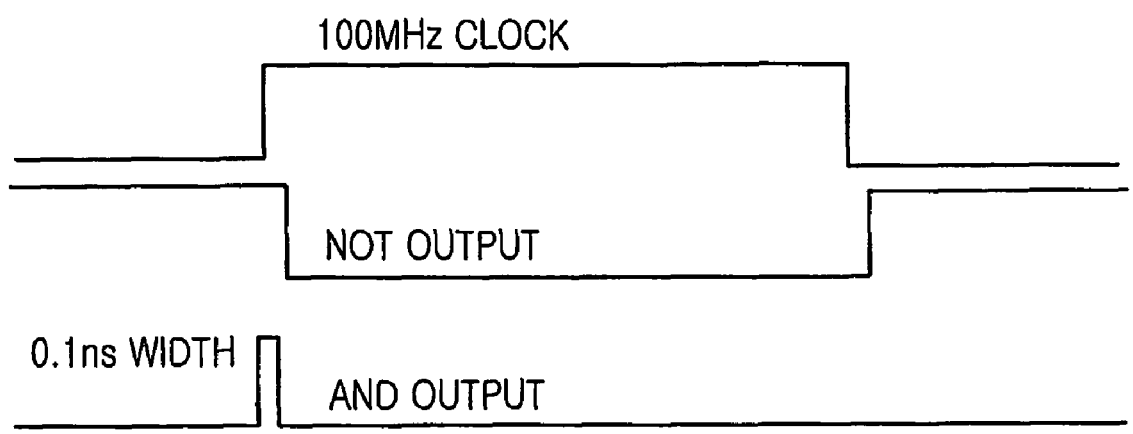
FIG. 3 is a diagram illustrating impulses generated by the delay time controller 2.

FIG. 2 is a diagram illustrating a structure of the delay time controller 2. The delay time controller 2 is comprised of AND circuits A1 to A4 and a NOT circuit N1. As illustrated in FIG. 3, the NOT circuit N1 receives a clock CLK of 100 MHz generated by a crystal oscillator (not shown) and sends a NOT output to the AND circuit A1. The AND circuit A1 receives the clock and the NOT output, ANDs the received signals, and generates a pulse as an AND output. For example, a time width of the pulse becomes about 0.1 nsec as shown in FIG. 3.

The AND circuit A2 ANDs the pulse input and an input '1', and sends its output signal K1 to the matched filter 1-1. The AND circuit A3 ANDs the pulse input and an input '1' when transmission data is '1', ANDs the pulse input and an input '0' when transmission data is '0', and sends its output signal K2 to the matched filter 1-2. The AND circuit A4 ANDs the pulse input and an input '0' when transmission data is '1', ANDs the pulse input and an input '1' when transmission data is '0', and sends its output signal K3 to the matched filter 1-3.

That is, when transmission data is '1', the output signals K1-1 and K2-1 are sent to the matched filter 1-1 and the matched filter 1-2, and when transmission data is '0', the output signals K1-1 and K3-1 are sent to the matched filter 1-1 and the matched filter 1-3.

In addition, the delay time controller 12 has the same structure as the delay time controller 2. Here, when transmission data is '1', output signals K1-2 and K2-2 are sent to the matched filter 11-1 and the matched filter 11-2, and when transmission data is '0', output signals K1-2 and K3-2 are sent to the matched filter 11-1 and the matched filter 11-3.

Figure 4:
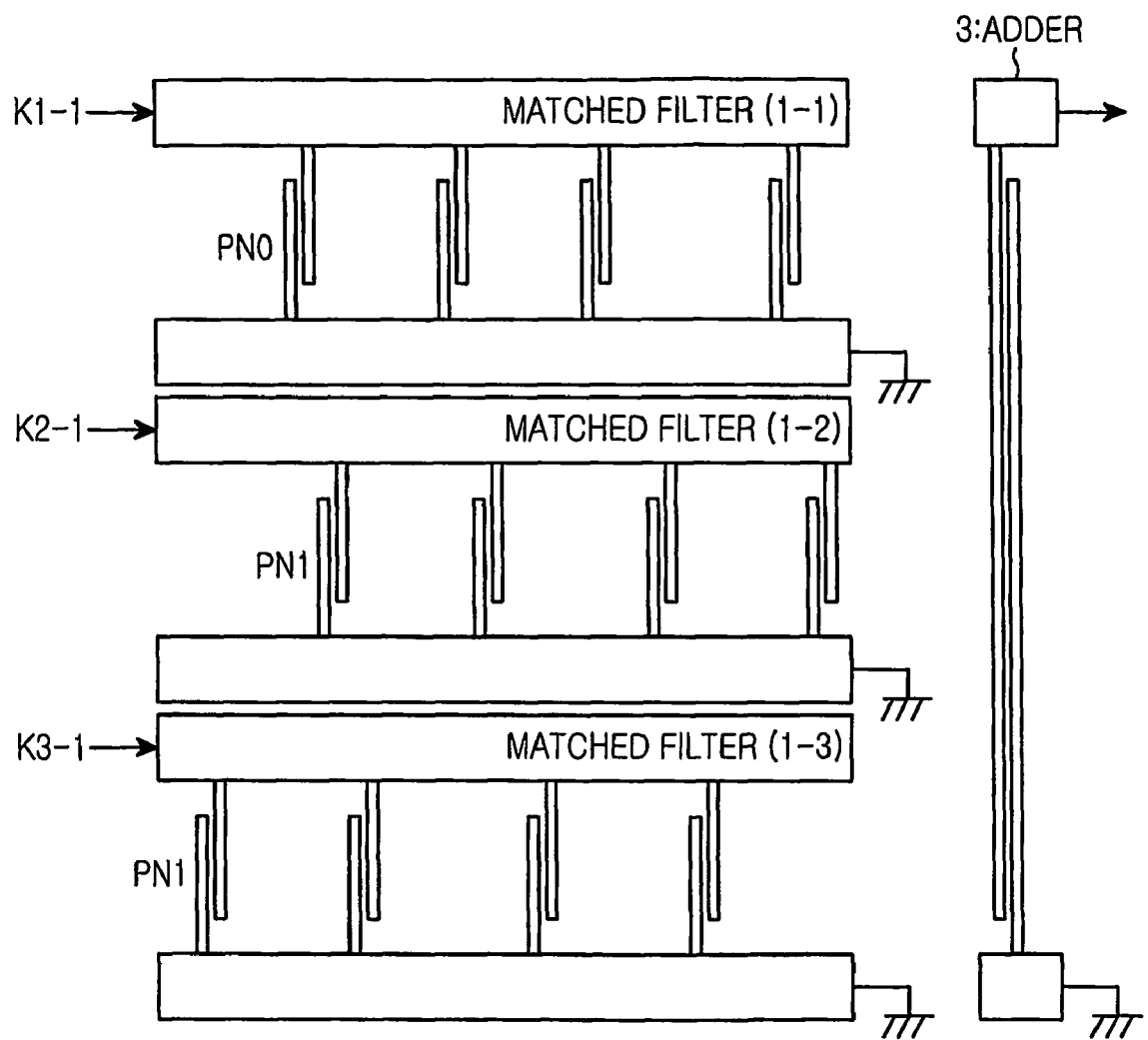
FIG. 4 is a diagram illustrating a structure of the matched filters 1-1 to 1-3 and the adder 3.
Figure 5:
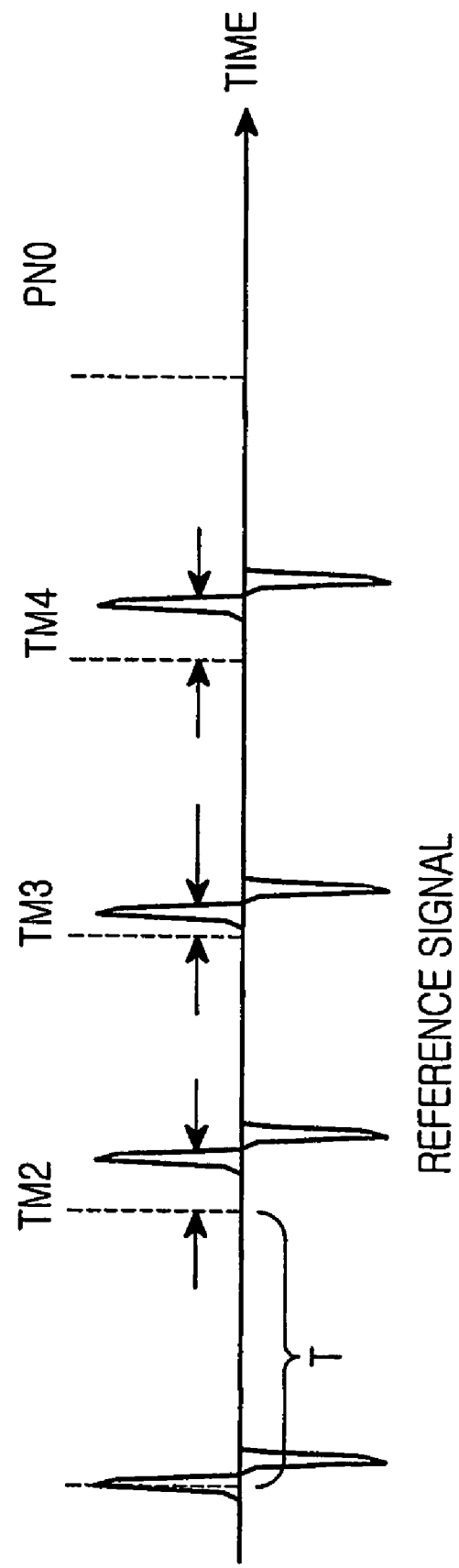
FIG. 5 is a waveform diagram illustrating a signal waveform spread with a spreading code PN0.

FIG. 4 is a diagram illustrating a structure of the matched filters 1-1 to 1-3 and the adder 3. The matched filters 1-1 to 1-3 are SAW (Surface Acoustic Wave) matched filters, and the matched filter 1-1 outputs a reference signal composed of 4 pulses of FIG. 5 for the input signal K1-1 to the adder 3. As shown in FIGS. 4 and 5, an arrangement pattern of a comb teeth-patterned electrode of the matched filter 1-1 is structured to be matched with a signal pattern in which positive and negative pulses appear at a time separated from a reference time indicated by a dotted line divided by a time period T by a time 0 and pseudo-random times TM2, TM3 and TM4, and a spreading code PN0 is prescribed according to this structure. In addition, as shown in FIG. 4, each comb teeth-patterned electrode of the matched filter 1-1 is positioned in an input side of the signals K1-1 to K3-1 (located in the left in FIG. 4) over the each comb teeth-patterned electrode of the matched filter 1-2, and an output side of the above signals (located in the right in FIG. 4) over the matched filter 1-3.

Figure 6:
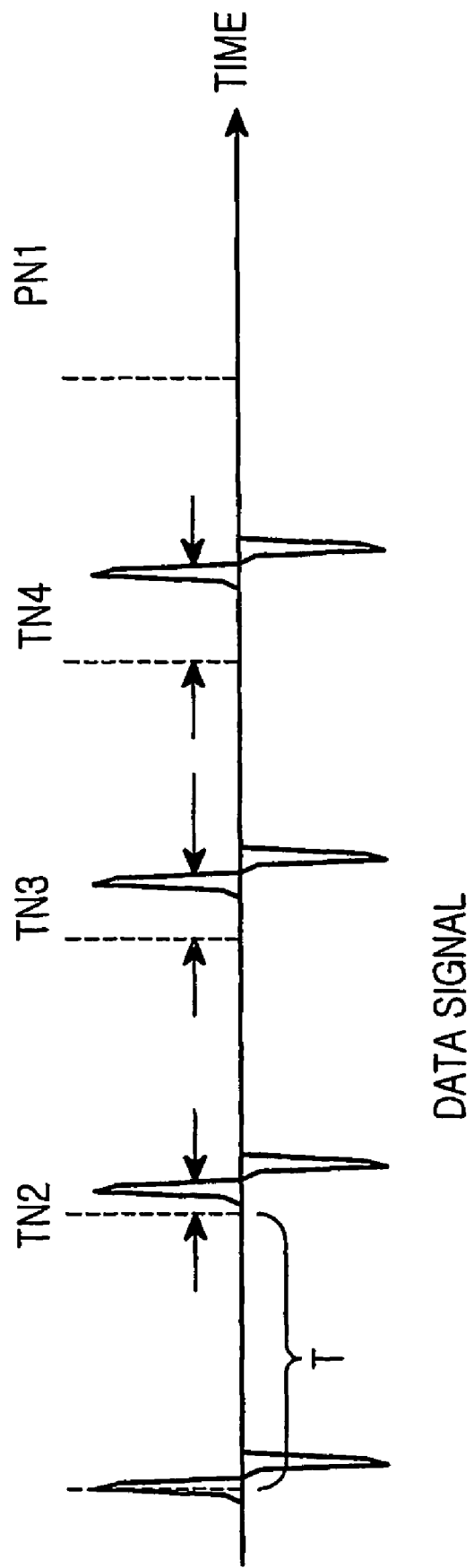
FIG. 6 is a waveform diagram illustrating a signal waveform spread with a spreading code PN1.

The matched filters 1-2 and 1-3, like the matched filter 1-1, are SAW matched filters, and output a data signal composed of 4 pulses as shown in FIG. 6, to the adder 3. As shown in FIGS. 4 and 6, an arrangement pattern of a comb teeth-patterned electrode of the matched filters 1-2 and 1-3 is structured to be matched with a signal pattern in which positive and negative pulses appear at a time separated from a reference time indicated by a dotted line divided by a time period T by a time 0 and pseudo-random times TN2, TN3 and TN4, and a spreading code PN1 is prescribed according to this structure. In addition, as shown in FIG. 4, an arrangement pattern of a comb teeth-patterned electrode of the matched filter 1-2 is positioned in an output side of the signals K1-1 to K3-1 (located in the right in FIG. 4) over the matched filters 1-1 and 1-3. In addition, an arrangement pattern of each comb teeth-patterned electrode of the matched filter 1-3 is positioned in an input side of the signals K1-1 to K3-1 (located in the left in FIG. 4) over the matched filters 1-1 and 1-2.

The adder 3 is an adder circuit for receiving the reference signal and the data signals and then adding up these signals, and outputs the addition signal to the PA 4. In addition, as shown in FIG. 4, the adder 3 is structured such that it has comb teeth-patterned electrodes having an enough length to receive the reference signal and the data signals which are surface acoustic waves output from the matched filters 1-1 to 1-3.

The PA 4 is an amplification circuit for amplifying a signal level of the addition signal, and outputs its application signal to the switch 5.

The switch 5 is a switching section for switching the connection between the antenna 6 and the PA 4 and the LNA 7. During data transmission, the switch 5 switches a connection terminal to the PA4 based on a control signal from the upper layer 31, and then outputs a received amplification signal to the antenna 6. During data reception, the switch 5 switches the connection terminal to the antenna 6 based on the control signal from the upper layer 31, and then outputs a radio wave signal received from the antenna 6 to the LNA 7.

The antenna 6 radiates an input amplification signal into a radio wave during data transmission, and outputs a received radio wave to the switch 5 during data reception.

The LNA 7 is an amplification circuit for amplifying a signal level of a received signal, and outputs its amplification signal to the matched filters 8-1 and 8-2.

Figure 7:
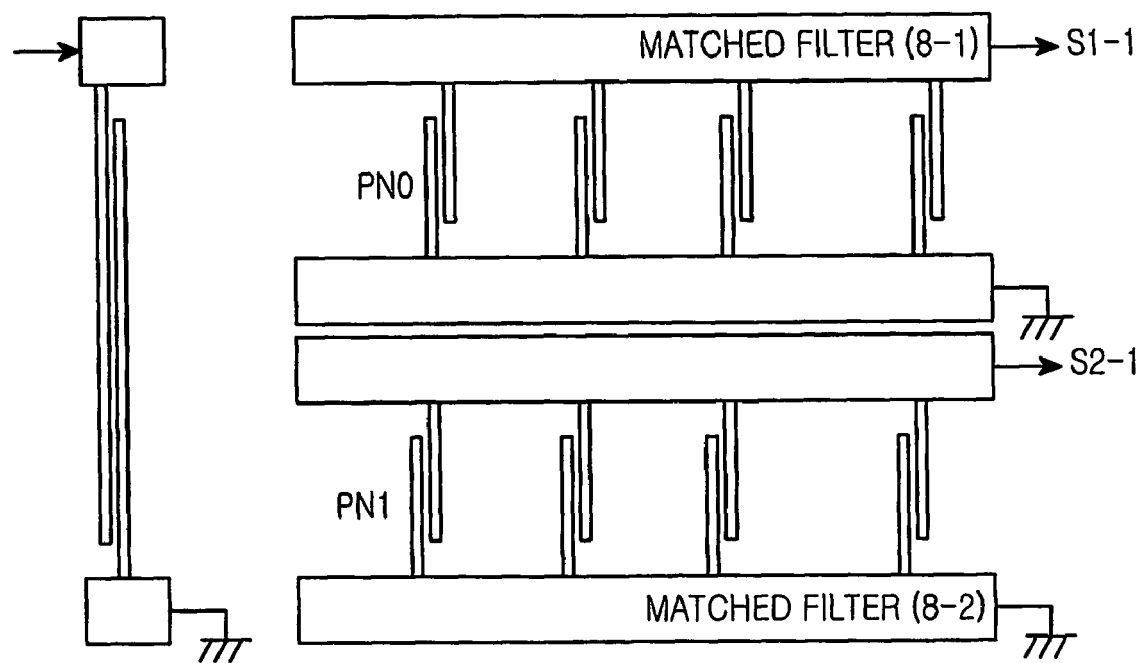
FIG. 7 is a diagram illustrating a structure of the matched filters 8-1 and 8-2.

FIG. 7 is a diagram illustrating a structure of the matched filters 8-1 and 8-2. The matched filter 8-1 outputs a predetermined pulse to the delay time measurer 9 in resonance with a signal pattern of the reference signal composed of 4 pulses of FIG. 5, for the input amplification signal. An arrangement pattern of a comb teeth-patterned electrode of the matched filter 8-1 is structured such that it is resonant with a signal pattern in which positive and negative pulses appear at a time separated from a reference time indicated by a dotted line divided by a time period T by a time 0 and pseudo-random times TM2, TM3 and TM4, and the matched filter 8-1 detects a spreading code spread with a spreading code PN0 according to this structure and outputs a signal S1-1.

The matched filter 8-2, like the matched filter 8-1, outputs a predetermined pulse to the delay time measurer 9 in resonance with a signal pattern of the data signal composed of 4 pulses shown in FIG. 6, for the input amplification signal. An arrangement pattern of a comb teeth-patterned electrode of the matched filter 8-2 is structured such that it is resonant with a signal pattern in which positive and negative pulses appear at a time separated from a reference time indicated by a dotted line divided by a time period T by a time 0 and pseudo-random times TN2, TN3 and TN4, and the matched filter 8-2 detects a spreading code spread with a spreading code PN1 according to this structure and outputs a signal S2-1.

Figure 8:
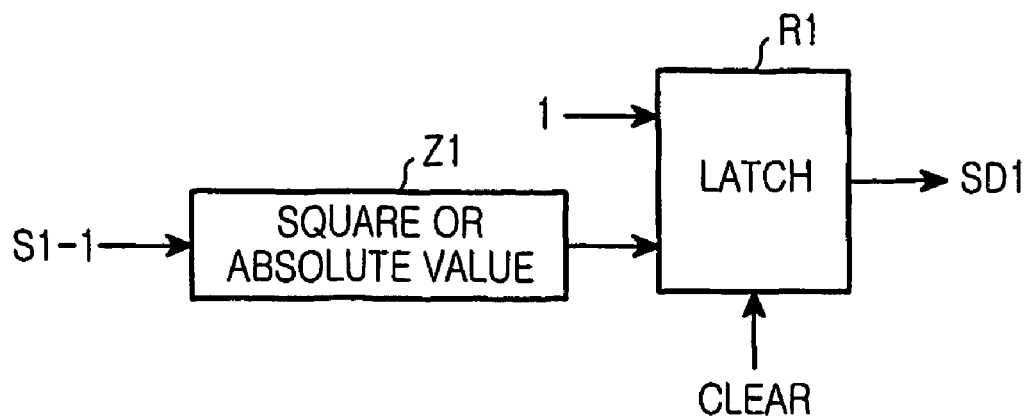
FIG. 8 is a diagram illustrating a structure of the latch circuit R1.
Figure 9:
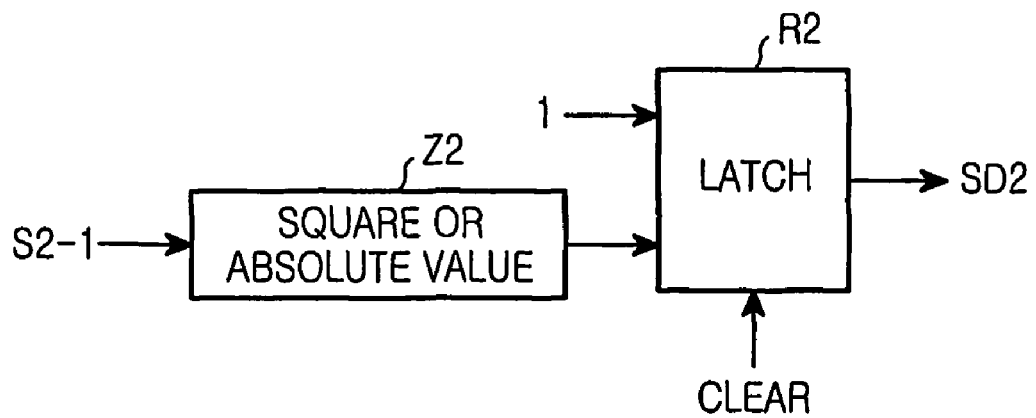
FIG. 9 is a diagram illustrating a structure of the latch circuit R2.
Figure 10:
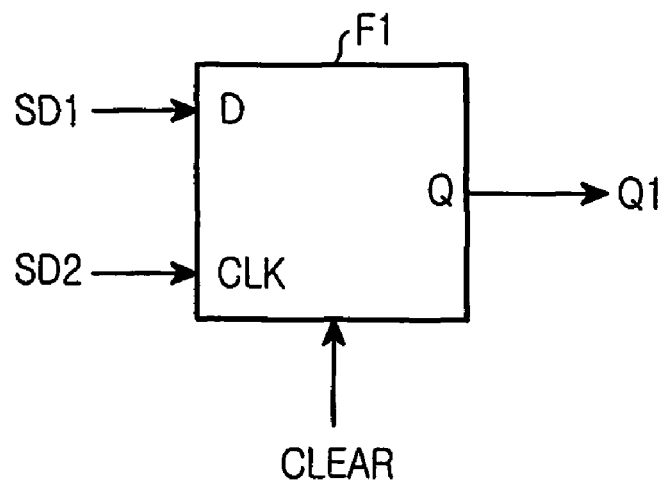
FIG. 10 is a diagram illustrating a structure of the D-FF circuit F1.
Figure 11:
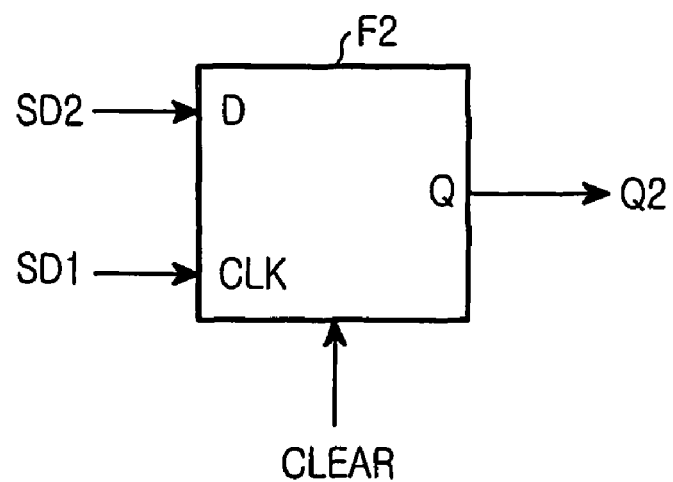
FIG. 11 is a diagram illustrating a structure of the D-FF circuit F2.

The delay time measurer 9 is comprised of latch circuits R1 and R2, and square or absolute value circuits Z1 and Z2 of FIGS. 8 and 9; D-FF circuits F1 and F2 of FIGS. 10 and 11; and clear circuits of FIGS. 12 and 13.

The square or absolute value circuit Z1 receives an input signal S1-1, calculates a square value or an absolute value of the received input signal S1-1, and outputs the result value to the latch circuit R1. The latch circuit R1 receives the square value or absolute value of the signal S1-1, latches data '1' at rising of this signal, and outputs a latched output SD1.

The square or absolute value circuit Z2, like the square or absolute value circuit Z1, calculates a square value or an absolute value of the input signal S2-1, and outputs the result value to the latch circuit R2. The latch circuit R2, like the latch circuit R1, receives the square value or absolute value of the signal S2-1, latches data '1' at rising of this signal, and outputs a latched output SD2.

The D-FF circuit F1 has a D terminal receiving the latch output SD1 and a CLK terminal receiving the latch output SD2, reads an input state of the D terminal when an input state of the CLK terminal changes from L to H, and outputs an output signal Q1.

The D-FF circuit F2 has a D terminal receiving the latch output SD2 and a CLK terminal receiving the latch output SD1, reads an input state of the D terminal when an input state of the CLK terminal changes from L to H, and outputs an output signal Q2.

Figure 12:
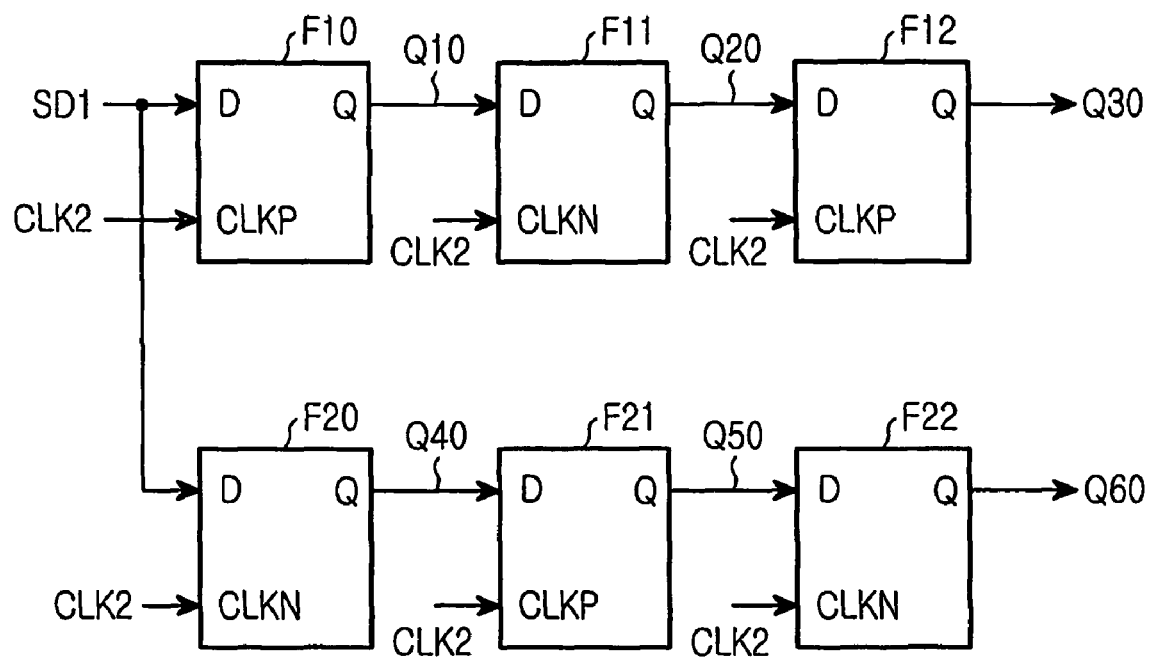
FIG. 12 is a diagram illustrating a front-end structure of the clear circuit.
Figure 13:
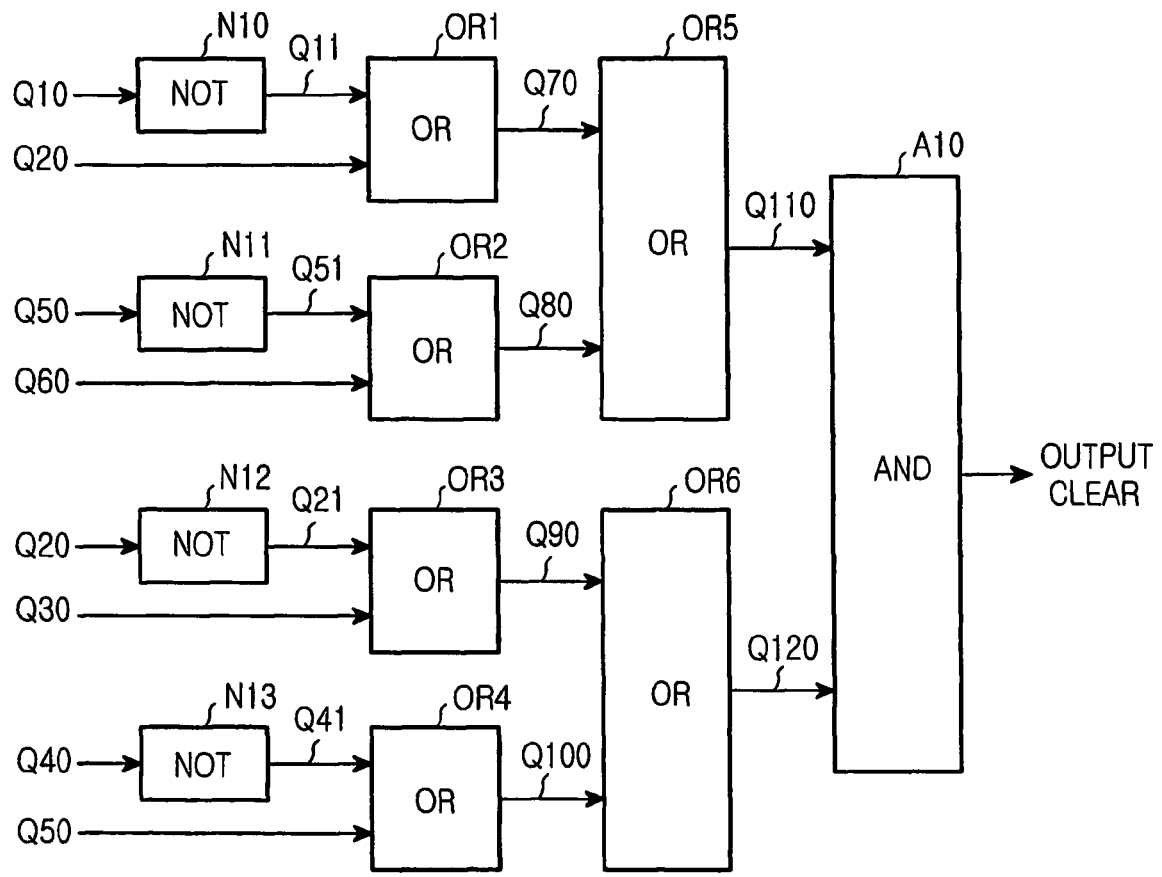
FIG. 13 is a diagram illustrating a back-end structure of the clear circuit.

FIG. 12 illustrates a front-end structure of a clear circuit for clearing the latch circuits R1 and R2, and the D-FF circuit F1 and F2, and FIG. 13 illustrates a back-end structure of the clear circuit. The front-end part of the clear circuit is comprised of D-FF circuits F10 to F12 and F20 to F22.

The D-FF circuit F10 has a D terminal receiving the latch output SD1 and a CLKP terminal receiving a 200 MHz clock CLK2 generated by a crystal oscillator (now shown), reads an input state of the D terminal when an input state of the CLKP terminal changes from L to H, and outputs an output signal Q10. Likewise, the D-FF circuit F20 has a D terminal receiving the latch output SD1 and a CLKN terminal receiving a clock CLK2, reads an input state of the D terminal when an input state of the CLKN terminal changes from H to L, as opposed to the D-FF circuit F10, and outputs an output signal Q40.

The D-FF circuit F11 has a D terminal receiving the output signal Q10 and a CLKN terminal receiving the clock CLK2, reads an input state of the D terminal when an input state of the CLKN terminal changes from H to L, and outputs an output signal Q20. Likewise, the D-FF circuit F21 has a D terminal receiving the output signal Q40 and a CLKP terminal receiving the clock CLK2, reads an input state of the D terminal when an input state of the CLKP terminal changes from L to H, as opposed to the D-FF circuit F11, and outputs an output signal Q50.

The D-FF circuit F12 has a D terminal receiving the output signal Q20 and a CLKP terminal receiving the clock CLK2, reads an input state of the D terminal when an input state of the CLKP terminal changes from L to H, and outputs an output signal Q30. Likewise, the D-FF circuit F22 has a D terminal receiving the output signal Q50 and a CLKN terminal receiving the clock CLK2, reads an input state of the D terminal when an input state of the CLKN terminal changes from H to L, as opposed to the D-FF circuit F12, and outputs an output signal Q60.

The back-end part of the clear circuit is comprised of NOT circuits N10 to N13, OR circuits OR1 to OR6, and an AND circuit A10. The NOT circuit N10 receives the output signal Q10 and outputs an inversed output Q11, the NOT circuit N11 receives the output signal Q50 and outputs an inversed output Q51, the NOT circuit N12 receives the output signal Q20 and outputs an inversed output Q21, and the NOT circuit N13 receives the output signal Q40 and outputs an inversed output Q41, The OR circuit OR1 ORs the inversed output Q11 and the output signal Q20, and outputs an output signal Q70, the OR circuit OR2 ORs the inversed output Q51 and the output signal Q60, and outputs an output signal Q80, the OR circuit OR3 ORs the inversed output Q21 and the output signal Q30, and outputs an output signal Q90, and the OR circuit OR4 ORs the inversed output Q41 and the output signal Q50, and outputs an output signal Q100.

In addition, the OR circuit OR5 ORs the output signal Q70 and the output signal Q80, and outputs an output signal Q110, and the OR circuit OR6 ORs the output signal Q90 and the output signal Q100, and outputs an output signal Q120.

The AND circuit A10 ANDs the output signal Q100 and the output signal Q120, and outputs a clear signal to the latch circuits R1 and R2, and the D-FF circuits F1 and F2.

Figure 14:
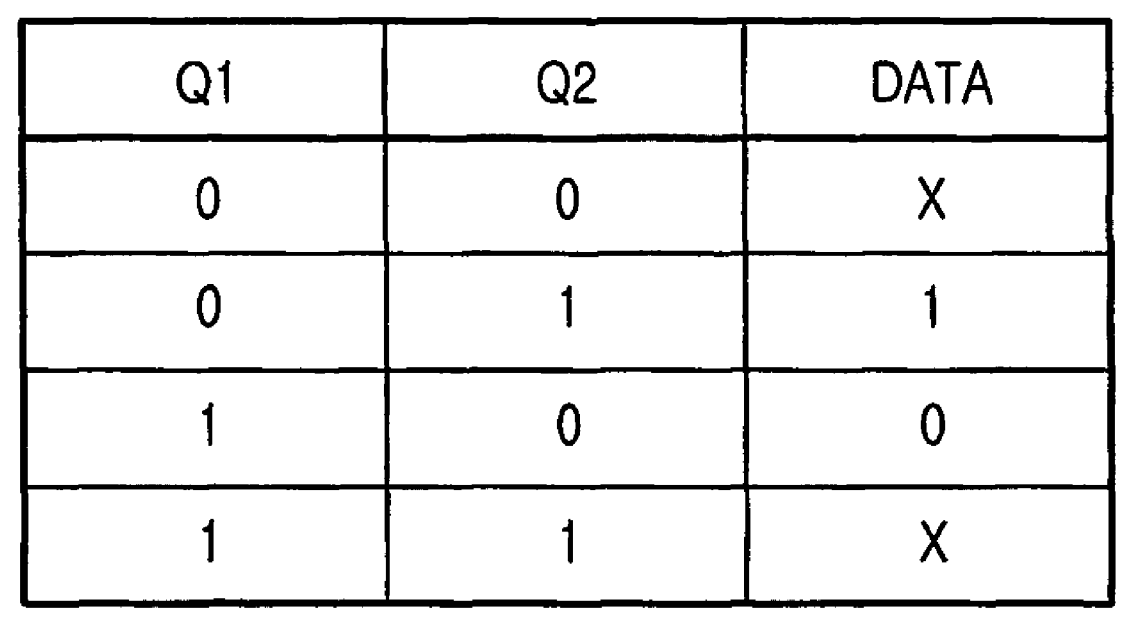

The data decider 10 decides data based on a data decision table of FIG. 14. That is, when the output signals Q1 and Q2 are both '0', this is decided as null data. When the output signal Q1 is '0' and the output signal Q2 is '1', this is decided as data '1'. When the output signal Q1 is '1' and the output signal Q2 is '0', this is decided as data '0'. When the output signals Q1 and Q2 are both '1', this is decided as null data.

The matched filter 11-1 to 11-3 correspond to the matched filters 1-1 to 1-3, the delay time controller 12 corresponds to the delay time controller 2, and the adder 13 corresponds to the adder 3, and the corresponding elements have the same structure.

The mixer 21 receives an addition signal output from the adder 13 and a local signal for frequency-converting the addition signal at a high frequency band, output from the local oscillator 23, and frequency-converts the addition signal.

The PA 14 corresponds to the PA 4, the switch 15 corresponds to the switch 5, the antenna 16 corresponds to the antenna 6, and the LNA 17 corresponds to the LNA 7, and the corresponding elements have the same structure.

The mixer 22 receives an amplification signal amplified by the LNA 17 and a local signal for frequency-converting the amplification signal at a low frequency band, and frequency-converts the amplification signal.

The matched filters 18-1 and 18-2 correspond to the matched filters 8-1 and 8-2, the delay time measurer 19 corresponds to the delay time measurer 9, and the data decider 20 corresponds to the data decider 10, and the corresponding elements have the same structure.

The IF 30 is an interface having a serial-parallel conversion function. When transmission data is received from the upper layer 31, the IF 30 serial-to-parallel-converts the received transmission data, and outputs the converted transmission data to the delay time controllers 2 and 12. When demodulated reception data is received from the data deciders 10 and 20, the IF 30 parallel-to-serial-converts the received demodulated data, and outputs the converted data to the upper layer 31.

The upper layer 31 is a layer higher than a lower layer such as a physical layer and a data link layer specified in, for example, OSI, and has a function of providing a service to a user. That is, for example, an application layer, a kind of the upper layer 31, outputs transmission data to the IF 30 after outputting a control signal indicating connection switching to the switch 5. During non-data transmission, the switch 5 is switched to the antenna 6, and during data reception, the IF 30 receives reception data.

Next, an operation of the ultra wideband radio transceiver according to this embodiment will be described with reference to the drawings. In the first and second transmitters of FIG. 1, if the upper layer 31 outputs a control signal for switching the switches 5 and 15 to the PA 4 and PA 14 in response to a data transmission request from an application layer and then outputs transmission data to the IF 30, then the IF 30 serial-to-parallel-converts the transmission data and outputs the converted transmission data to the delay time controllers 2 and 12.

The delay time controllers 2 and 12 receive the transmission data and start a transmission process. Herein, the succeeding processes are independently performed in parallel by the first and second transmitters. Therefore, a description will first be made on an operation of the delay time controller 2 constituting the first transmitter, and next, a description will be made of an operation of the second transmitter different from that of the first transmitter.

The delay time controller 2 receives transmission data from the IF 30, and generates a 100 MHz clock by dividing a 200 MHz clock by means of a crystal oscillator. The AND circuit A1 receives this clock and generates a pulse of FIG. 3.

The generated pulse is input to the AND circuit A2, and an output signal K1-1 is input to the matched filter 1-1. The matched filter 1-1, as shown in the upper part of FIG. 15, receives the signal K1-1, and generates pulses at a time separated from a reference time indicated by a dotted line divided by a time period T by a time 0 and pseudo-random times TM2, TM3 and TM4.

When the transmission data is input to the AND circuit A3, the AND circuit A3 ANDs the pulse input and an input '1' if the transmission data is 1, and ANDs the input pulse and an input '0' if the transmission data is '0', and outputs an output signal K2-1 to the matched filter 1-2.

Figure 15:
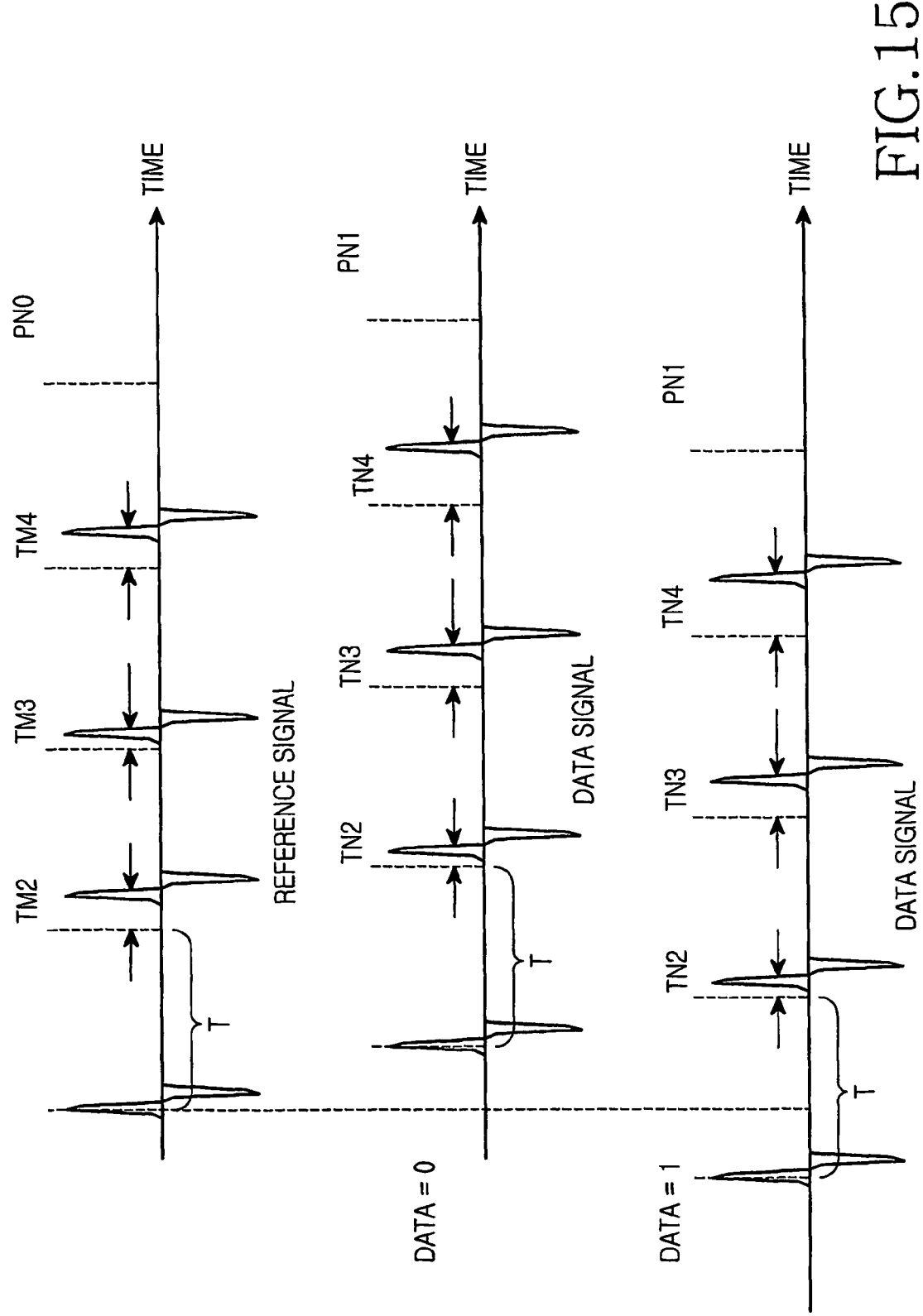
FIG. 15 is a waveform diagram illustrating waveforms of a reference signal and data signals.

The matched filter 1-2, as shown in the middle part of FIG. 15, modulates the signal K2-1 that is received a predetermined time ahead of the matched filter 1-1, with a first spreading code PN1 at a low frequency band (e.g., lower than 5 GHz; 3.5 to 4.5 GHz).

That is, when data is '1', the matched filter 1-2, as shown in the lower part of FIG. 15, generates pulses at a time separated from a reference time indicated by a dotted line divided by a time period T by a time 0 and pseudo-random times TN2, TN3 and TN4. In a signal pattern composed of these four pulses, a data signal is output ahead of the reference signal, and becomes a data signal indicating transmission data '1'.

In addition, when the transmission data is input to the AND circuit A4, the AND circuit A4 ANDs the pulse input and an input '0' if the transmission data is 1, and ANDs the input pulse and an input '1' if the transmission data is '0', and outputs an output signal K3-1 to the matched filter 1-3.

The matched filter 1-3, as shown in FIG. 4, modulates the signal K3-1 that is received a predetermined time behind the matched filter 1-1, with a first spreading code PN1 at a low frequency band (e.g., lower than 5 GHz; 3.5 to 4.5 GHz).

That is, when data is '0', the matched filter 1-3, as shown in the middle part of FIG. 15, generates pulses at a time separated from a reference time indicated by a dotted line divided by a time period T by a time 0 and pseudo-random times TN2, TN3 and TN4. In a signal pattern composed of these four pulses, a data signal is output behind the reference signal, and becomes a data signal indicating transmission data '0'.

The adder 3 adds up these signals, and outputs the added signal to the PA 4. That is, if transmission data is '1', the adder 3 receives the reference signal from the matched filter 1-1 and the data signal from the matched filter 1-2, adds up the two signals, and outputs the added signal to the PA 4.

However, if transmission data is '0', the adder 3 receives the reference signal from the matched filter 1-1 and the data signal from the matched filter 1-3, adds up the two signals, and outputs the added signal to the PA 4.

The PA 4 amplifies a signal level of the received added signal, and outputs an amplified signal to the switch 5.

The switch 5 switches its connection by receiving a switching control signal from the upper layer 31, and then outputs the amplified signal received from a terminal connected to the PA 4 to the antenna 6. The antenna 6 radiates the received amplified signal as radio waves.

Meanwhile, in the second transmitter, like in the first transmitter, the delay time controller 12 receives transmission data that was serial-to-parallel-converted by the IF 30, and outputs output signals K1-2 to K3-2 to the matched filters 11-1 to 11-3. The matched filters 11-1 to 11-3 receive the signals K1-2 to K3-2, and output a reference signal and data signals shown in FIG. 15, and the adder 13 adds up these signals.

The local oscillator 23 outputs to the mixer 21 a local signal for frequency-converting the addition signal at a high frequency band, and the mixer 21 receives the addition signal from the adder 13 and the local signal from the local oscillator 23, and frequency-converts the addition signal at a high frequency band (e.g., higher than 5 GHz; 6 to 7 GHz).

The PA 14 receives the frequency-converted addition signal, and amplifies the received addition signal. The switch 15 switches its connection by receiving a switching control signal from the upper layer 31, and then outputs an amplification signal received from a terminal connected to the PA 14 to the antenna 16. The antenna 16 radiates the received amplification signal as radio waves.

Meanwhile, the first and second receivers according to the embodiment initiate their reception processes upon receiving radio signals output from antennas 6 and 16 in a wideband radio transceiver other than this wideband radio transceiver. Herein, the succeeding processes are independently performed in parallel by the first and second receivers. Therefore, a description will first be made on an operation of the antenna 6 constituting the first receiver, and next, a description will be made of an operation of the second receiver different from that of the first receiver.

The antenna 6 receives a radiated radio wave, and outputs the received radio wave to the LNA 7 via the switch 5. The LNA 7 amplifies the received signal and outputs the amplified signal to the matched filters 8-1 and 8-2.

The matched filter 8-1 outputs an output signal S1-1 through resonance with a spread signal spread with a spreading code PN0 in the received amplification signal. Likewise, the matched filter 8-2 also outputs an output signal S2-1 by detecting a spread signal spread with a spreading code PN1 in the received amplification signal.

A spreading code being received at this time is the reference signal shown in the upper part of FIG. 15 and the data signal shown in the lower part of FIG. 15, when the received data is '1'. Since the data signal is input ahead of the reference signal, the matched filter 8-2 outputs the output signal S2-1 ahead of the output signal S1-1 output by the matched filter 8-1.

When the received data is '0', since a received spreading code is the reference signal in the upper part of FIG. 15 and the data signal in the middle part of FIG. 15 and the data signal is received a predetermined time behind the reference signal, the matched filter 8-1 outputs the output signal S2-1 ahead of the output signal S1-1 output by the matched filter 8-2.

The delay time measurer 9 receiving the output signals S1-1 and S2-1 outputs output signals Q1 and Q2. At this point, as to the latch outputs SD1 and SD2 input to the D-FF circuits F1 and F2, when data is '1', the latch output SD2 goes ahead of the latch output SD1 in terms of time. Therefore, in the D-FF circuit F1, at a time when the latch output SD2 is input to the CLK terminal and thus an input state of the CLK terminal changes from L to H, the latch output SD1 is not received yet, so a state of the D terminal is L. As a result, the output signal Q1 becomes '0'. In the D-FF circuit F2, at a time when the latch output SD1 is input to the CLK terminal and thus an input state of the CLK terminal changes from L to H, the latch output SD2 is already received, so a state of the D terminal is H. As a result, the output signal Q2 becomes '1'.

Meanwhile, when data is '0', the latch output SD1 goes ahead of the latch output SD2 in terms of time. Therefore, in the D-FF circuit F1, at a time when the latch output SD2 is input to the CLK terminal and thus an input state of the CLK terminal changes from L to H, the latch output SD1 is already received, so a state of the D terminal is H. As a result, the output signal Q1 becomes '1'. In the D-FF circuit F2, at a time when the latch output SD1 is input to the CLK terminal and thus an input state of the CLK terminal changes from L to H, the latch output SD2 is not received yet, so a state of the D terminal is L. As a result, the output signal Q2 becomes '0'.

When the output signals Q1 and Q2 are input to the data decider 10, the data decider 10 decides data based on the data decision table of FIG. 14, and outputs the decision result to the upper layer 31 as reception data via the IF 30.

In addition, when the latch output SD1 is input to the clear circuit, the front-end part of the clear circuit outputs the output signals Q10, Q20, Q30, Q40, Q50 and Q60 to the back-end part of the clear circuit. The back-end of the clear circuit outputs a clear signal by receiving theses signals.

Figure 16:
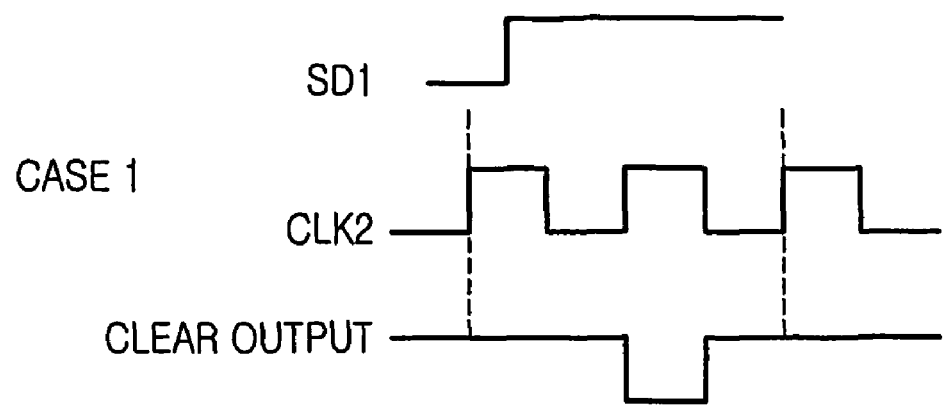
FIG. 16 is a diagram illustrating a clear signal output in Case 1.
Figure 17:
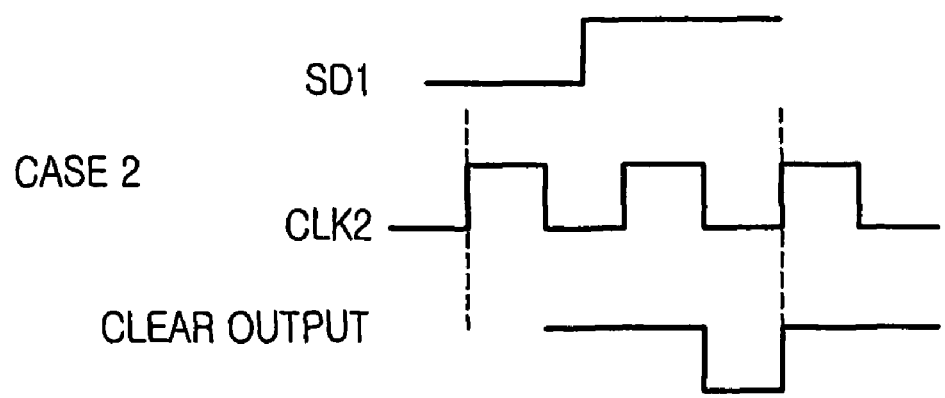
FIG. 17 is a diagram illustrating a clear signal output in Case 2.

FIG. 16 presents a clear output waveform for CLK2=H at a rising point of the latch output SD1, and FIG. 17 presents a clear output waveform for CLK2=L at a rising point of the latch output SD1. When CLK2 is H at a rising point of the latch output SD1, the clear signal is output between a half period and one period of CLK2, as shown in FIG. 17. Since the CLK2 is 200 MHz, the clear signal is output between 5 nsec and 10 nsec.

The output clear signal is input to the latch circuits R1 and R2 and the D-FF circuits F1 and F2, and clears the latch circuits R1 and R2 and the D-FF circuits F1 and F2.

Meanwhile, in the second receiver, like in the first receiver, the antenna 16 receives a radio wave signal radiated by another wideband radio transceiver, and the LNA 17 amplifies the received radio wave signal. The local oscillator 23 outputs to the mixer 22 a local signal for frequency-converting the radio wave signal at a low frequency band, and the mixer 22 receives the amplification signal from the LNA 17 and the local signal from the local oscillator 23, and frequency-converts the amplification signal at a low frequency band (e.g., lower than 5 GHz; 3.5 to 4.5 GHz). The frequency-converted amplification signal is input to the matched filters 18-1 and 18-2, and the matched filters 18-1 and 18-2 detect a spreading code in the received amplification signal, and output their output signals S1-2 and S2-2. The delay time measurer 19 receive these signals, and outputs signals Q1 and Q2 based on which of the matched filters 18-1 and 18-2 has first outputted its output signal. The data decider 20 decides data based on the data decision table of FIG. 14 depending on the signals Q1 and Q2, and outputs the decision result to the upper layer 31 as reception data via the IF 30.

As described up to now, in the ultra wideband radio transceiver according to this embodiment, the transmitter can perform ultra wideband radio communication even though it correctly generates pseudo-random times. Therefore, the transmitter does not require a digital counter circuit capable of operating at high speed and thus, can reduce power consumption required in always operating the counter.

In addition, while the latch circuits R1 and R2 receiving a 200 MHz clock as a clear signal are holding the signals SD1 and SD2, it is possible to remove multipath influence of a 1-clock period (10 nsec). Moreover, it is possible to release a clear a half period (5 nsec) ahead in the 200 MHz clock.

Figure 18:
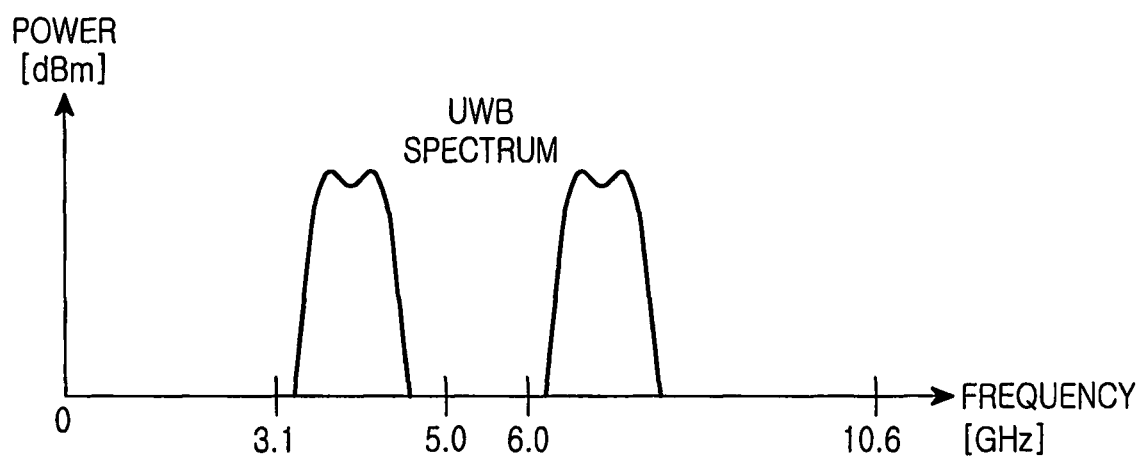
FIG. 18 is a diagram illustrating a UWB spectrum through an ultra wideband radio transceiver according to an embodiment of the present invention.

Further, FIG. 18 presents a UWB spectrum of a data transmitter through the first and second transmitters described up to now. As illustrated in FIG. 18, in the ultra wideband radio transceiver according to this embodiment, a frequency band used can be divided into two frequency bands, the first transmitter is set to a frequency band lower than 5 GHz and the second transmitter is set to a frequency band higher than 5 GHz, to thereby evade a WLAN band where interference may occur.

As mentioned above, the frequency bands used for the first and second transmitters can be set to, for example, 3.5 to 4.5 GHz and 6 to 7 GHz, respectively. That is, since two pairs of 1 GHz-bandwidth antennas can be used, it is possible to obtain an effect of reducing one antenna, compared with when 3.5 GHz to 7 GHz is covered with one antenna. In addition, when the antennas are divided into two modules, it is possible to secure free antenna arrangement, leading to a reduction in the entire module shape.

In addition, since a reception band of each antenna can be relatively narrowed, it is possible to increase reception performance of the antenna, leading to an increase in the entire system characteristic.

Furthermore, by dividing a frequency band in use into several bands, it is possible to obtain an effect of widely applying the invention to frequency diversity as well as band allocation for exclusive transmission/reception, Pico-Net (a network formed through Ac Hoc connection by Bluetooth), or connection apparatus.

Next, a frequency conversion simulation result in the wideband radio transceiver according to the embodiment will be presented. This simulation has been simply conducted between the first and second radio transmitters and the second radio receiver of FIG. 1.

FIG. 19 is a diagram of the simulation. A transmitter comprised of SRC1, SRC3, Matched filter, LPF1, BPF1, Disc Monopole in the left part of FIG. 19 corresponds to the second transmitter, and a receiver comprised of Disc Monopole, MIX2, SRC2, SRC4, LPF2, PWR1, and Matched Filter in the right part of FIG. 19 corresponds to the second radio receiver.

Figure 20:
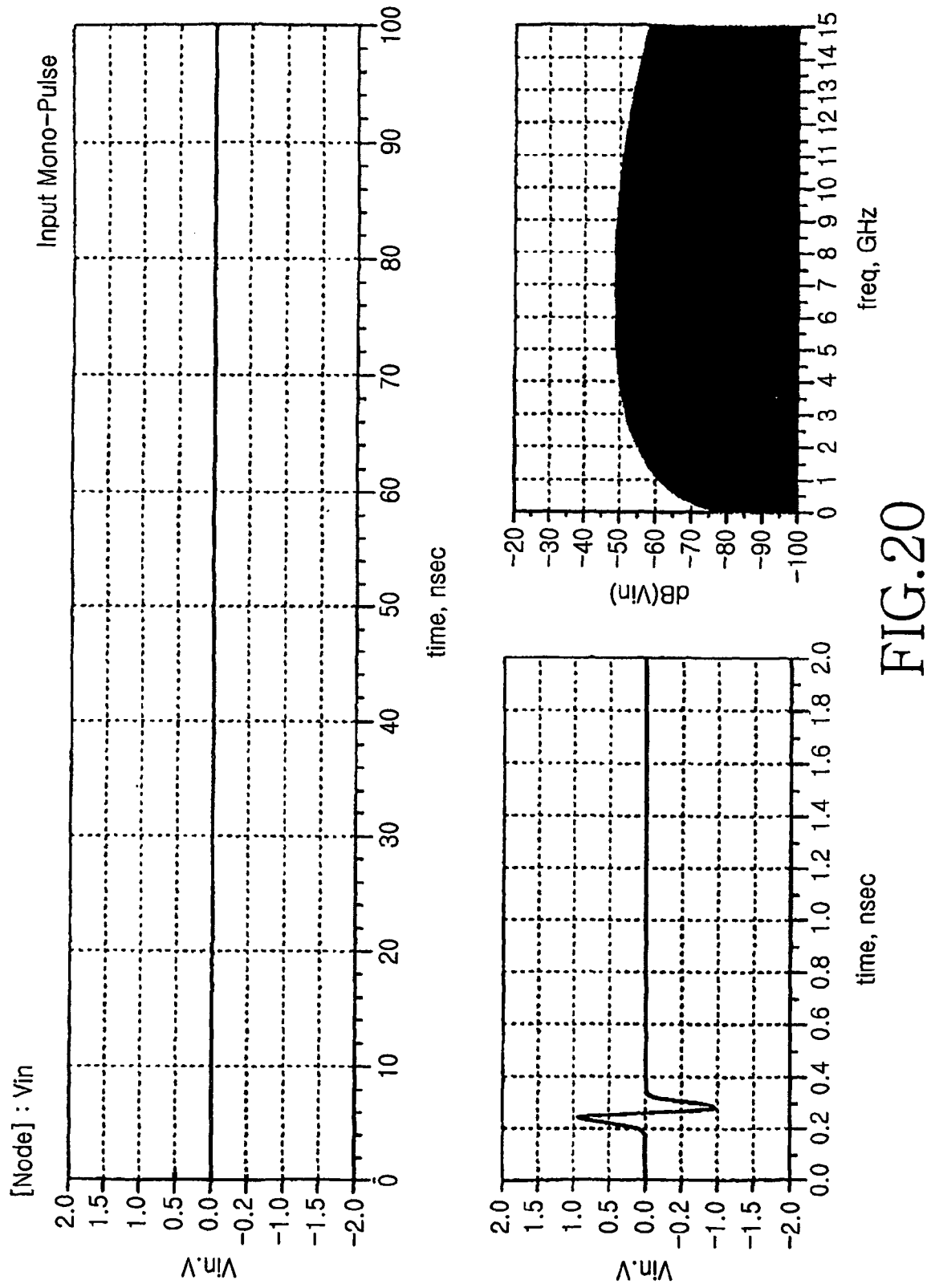
FIG. 20 is a diagram illustrating a signal Vin.

First, in the transmitter side, a 5 GHz monopulse (see Vin of FIG. 20) output by a local oscillator 1 (corresponding to SRC1 of FIG. 19) is input to a matched filter (corresponding to Matched Filter of FIG. 19). The monopulse is modulated based on a comb teeth-patterned electrode pattern, outputting a modulation signal Mod (see Mod of FIG. 21).

Figure 22:
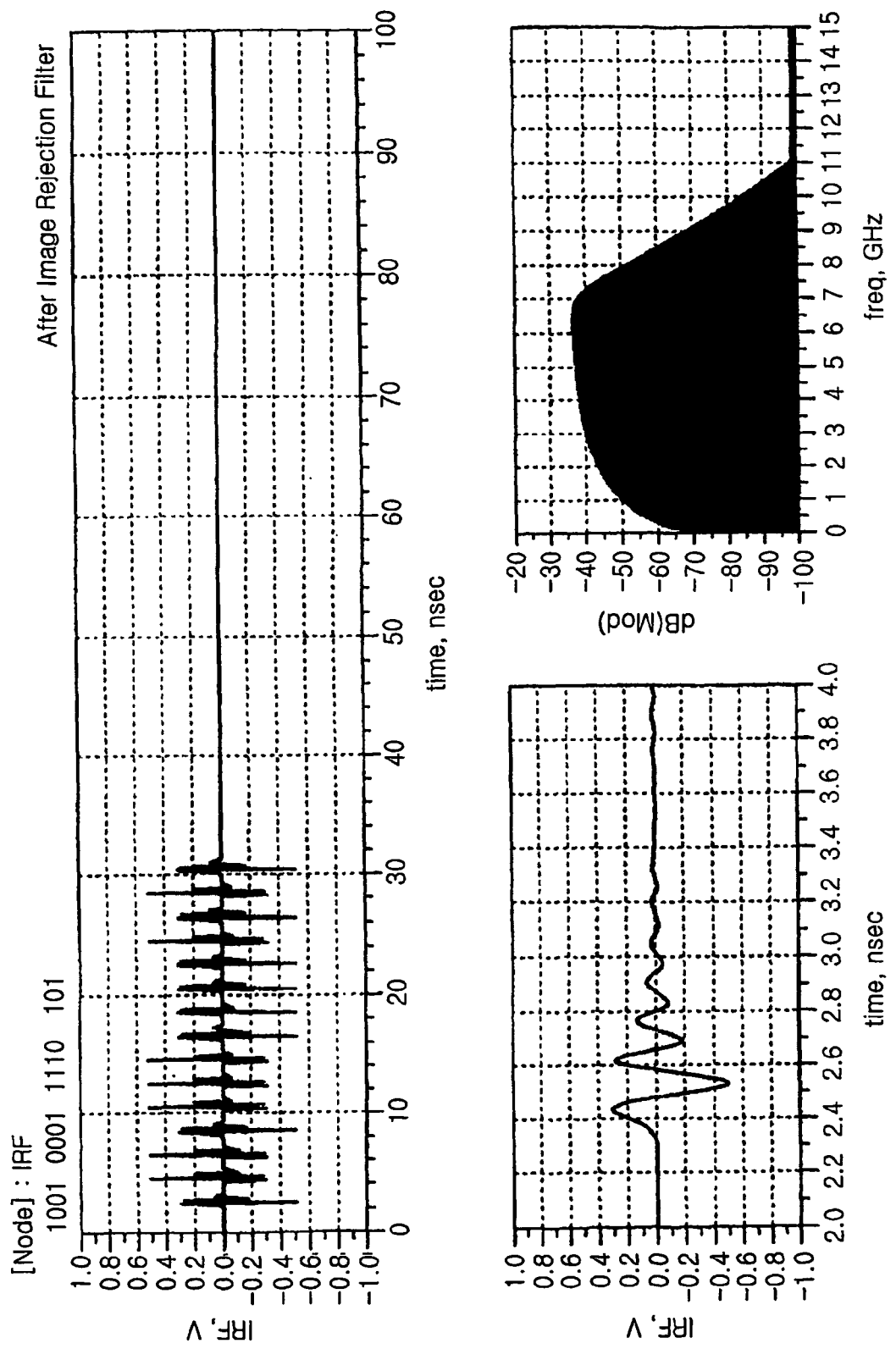
FIG. 22 is a diagram illustrating a signal IRF.

The modulation signal Mod is input to a low-pass filter (corresponding to LPF1 of FIG. 19), and a frequency component of over 7 GHz is removed therefrom, outputting a signal IRF composed of a frequency component of below 7 GHz (see IRF of FIG. 22).

Figure 23:
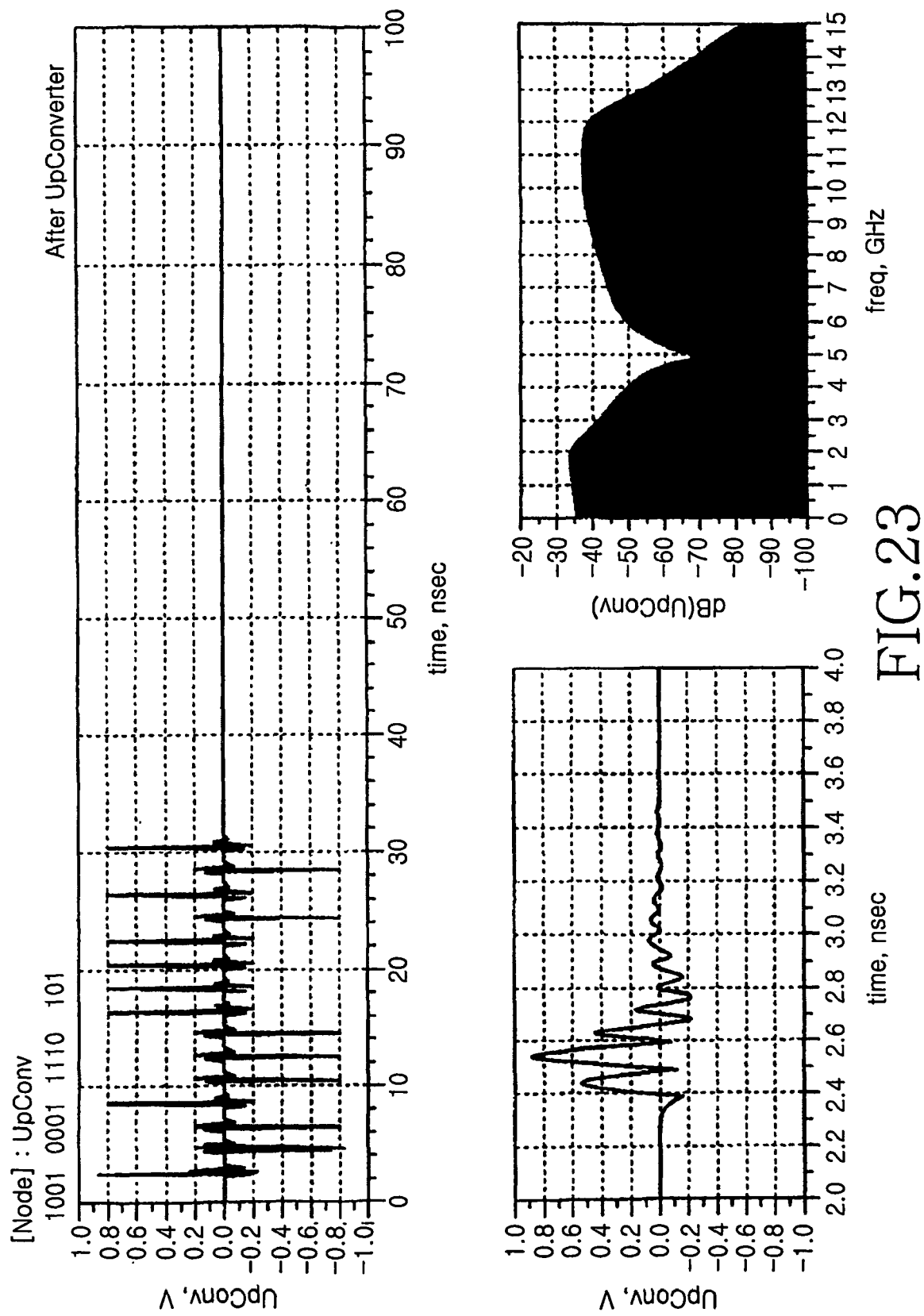
FIG. 23 is a diagram illustrating a signal UpConv.

The signal IRF is up-converted through a mixer 1 (corresponding to MIX1 of FIG. 19) using a local signal with an amplitude of 1V and a frequency of 5 GHz output by a local oscillator 3 (corresponding to SRC3 of FIG. 19), outputting a signal UpConv (see UpConv of FIG. 23).

Figure 24:
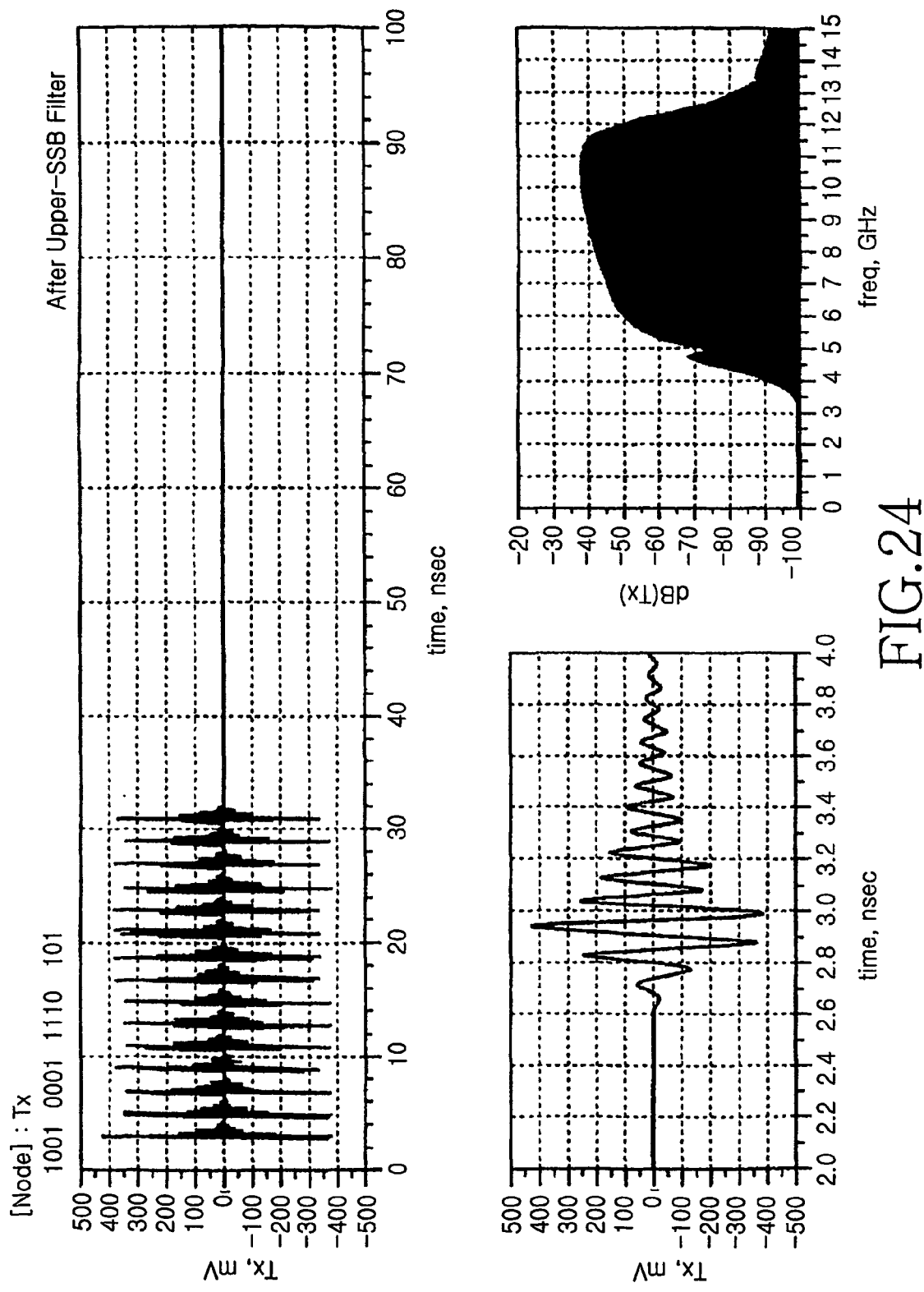
FIG. 24 is a diagram illustrating a signal Tx.

Since the signal UpConv includes an image signal generated through up-conversion at a frequency band of below 5 GHz, an image-removed signal Tx obtained by removing the image through a band-pass filter (corresponding to BPF1 of FIG. 19) with a center frequency 8.5 GHz and a pass band of 7 to 10 GHz is output to an antenna (corresponding to Monopole of FIG. 19) (see Tx of FIG. 24). The antenna radiates the signal Tx in the air.

Figure 25:
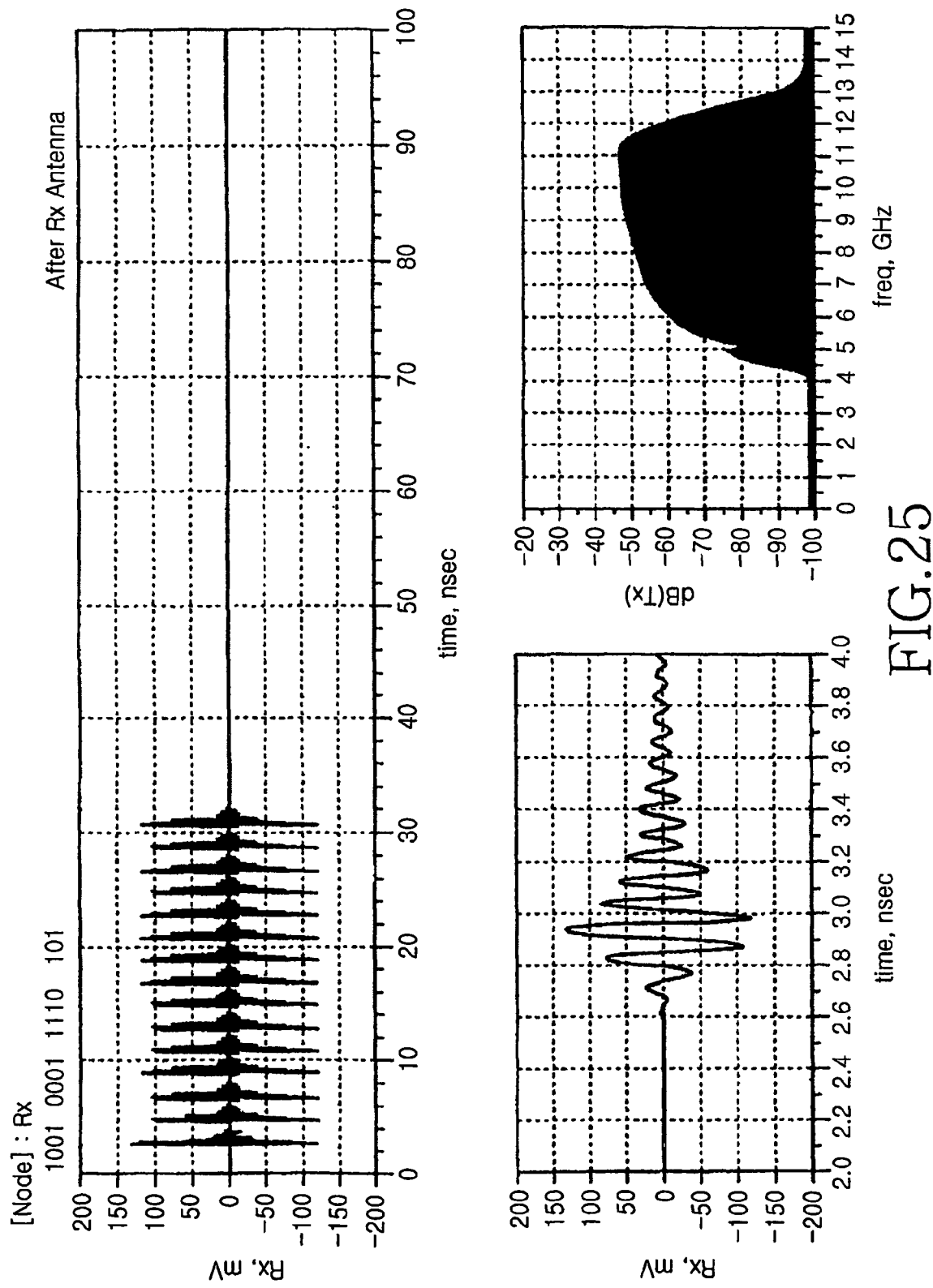
FIG. 25 is a diagram illustrating a signal Rx.

Next, in the receiver, the antenna (corresponding to Monopole of FIG. 19) receives a radio wave signal Rx radiated from the transmitter, and outputs the received signal Rx to a mixer 2 (corresponding to MIX2 of FIG. 19) (see Rx of FIG. 25).

Figure 26:
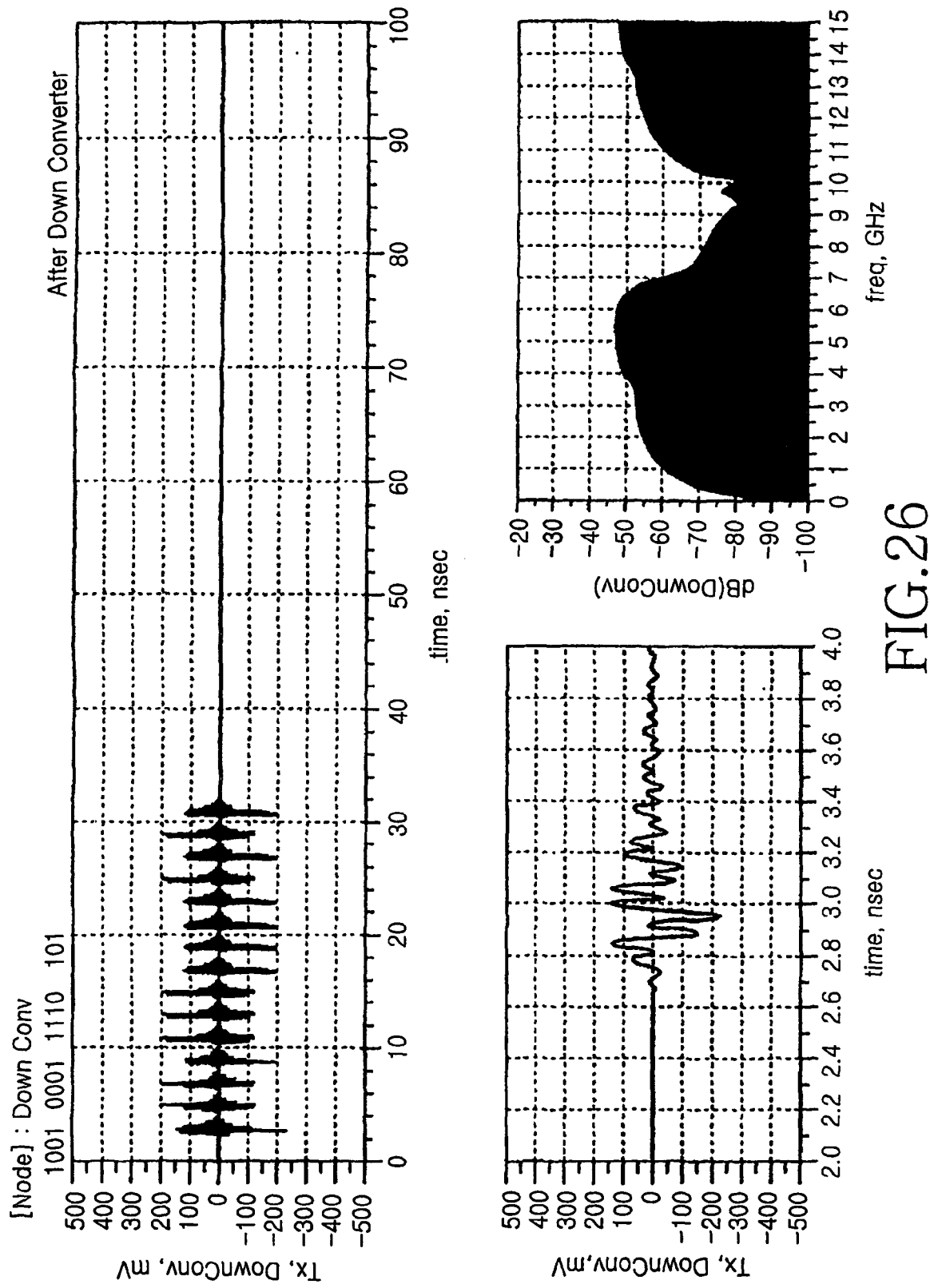
FIG. 26 is a diagram illustrating a signal DownConv.

The mixer 2 down-converts the radio wave signal Rx using a local signal with an amplitude of 1V and a frequency of 5 GHz output by a local oscillator 4 (corresponding to SRC4 of FIG. 19), and outputs a signal DownConv (see UpConv of FIG. 26).

Since the signal DownConv includes an image signal generated through down-conversion at a frequency band of over 9 GHz, a frequency component of over 9 GHz is removed through a low-pass filter 2 (corresponding to LPF2 of FIG. 19).

Figure 27:
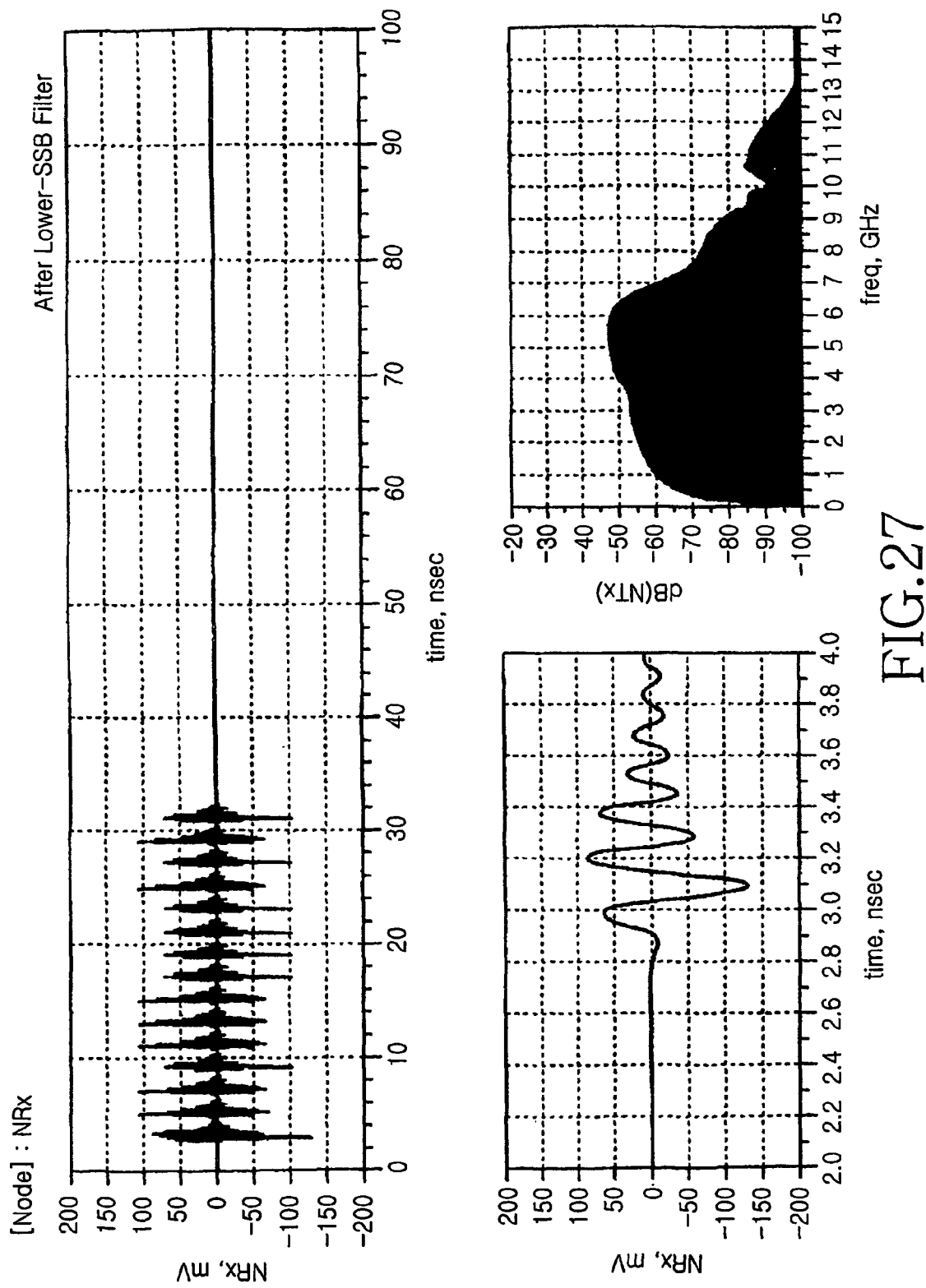
FIG. 27 is a diagram illustrating a signal NRx.

A noise adder comprised of PWR1 and SRC2 adds a noise level supposed to be actually generated in the world to the image-removed signal, and outputs a noise-added signal NRx (see NRx of FIG. 27). However, in this simulation, this is not used for simplicity.

The matched filter demodulates the signal NRx received and outputs a demodulated signal Vout.

Figure 21:
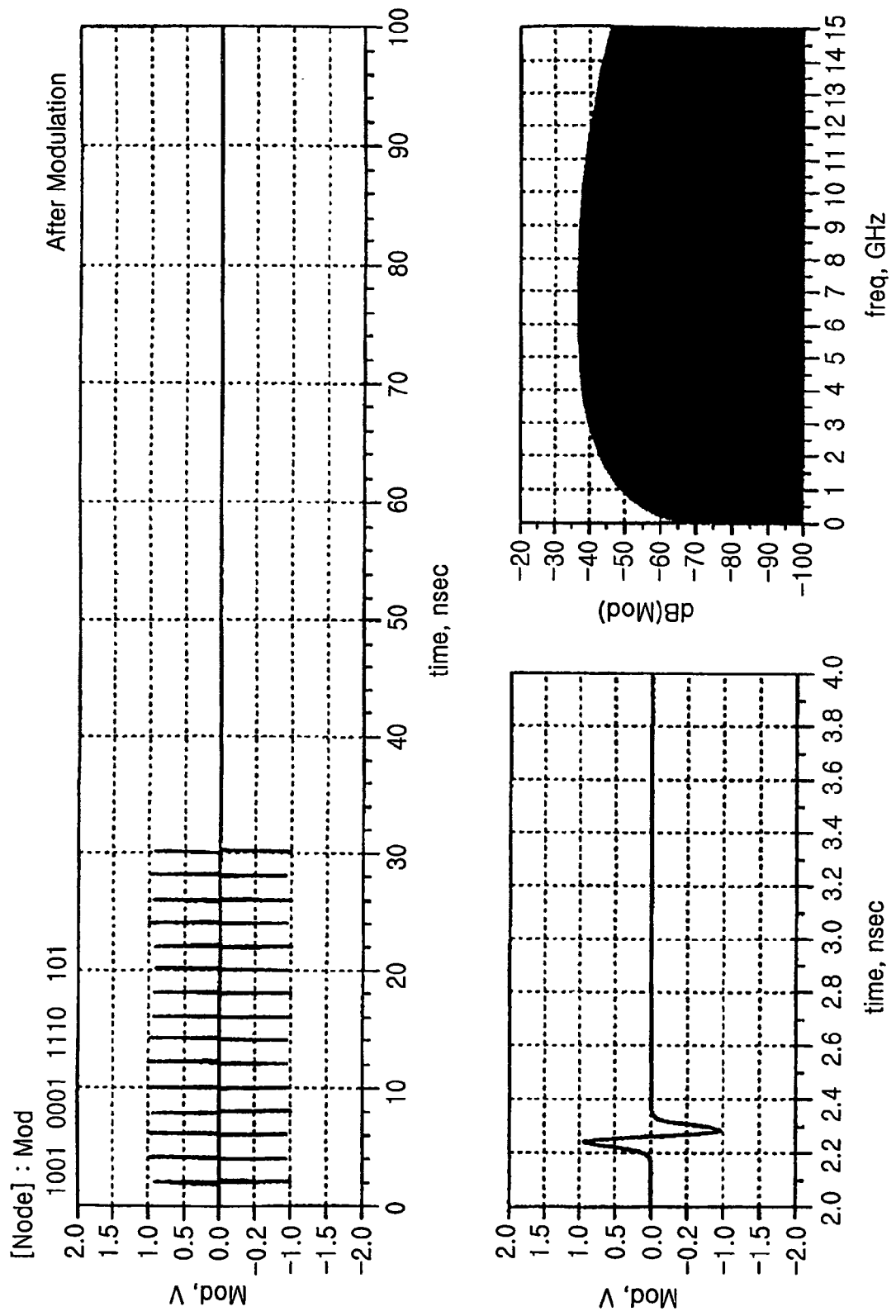
FIG. 21 is a diagram illustrating a signal Mod.
Figure 28:
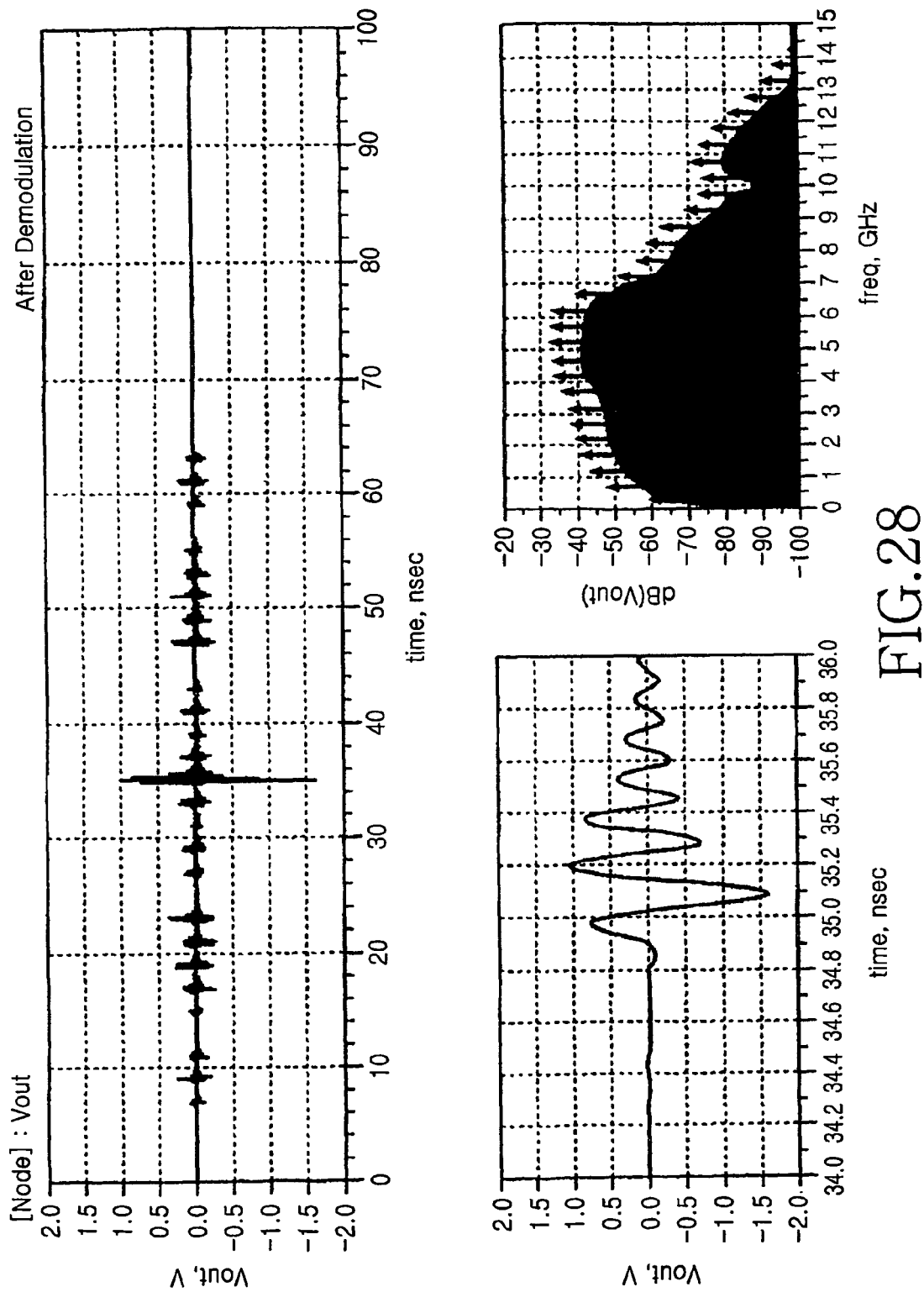
FIG. 28 is a diagram illustrating a signal Vout.

As described so far, in this simulation, the modulated signal presented in FIG. 21 is demodulated as shown in FIG. 28.

That is, in the ultra wideband radio transceiver according to the embodiment, a frequency band in use shown in FIG. 18 can be divided into two frequency bands, the first transmitter is set to a frequency band lower than 5 GHz and the second transmitter is set to a frequency band higher than 5 GHz, to thereby evade a WLAN band where interference may occur.

Figure 29:
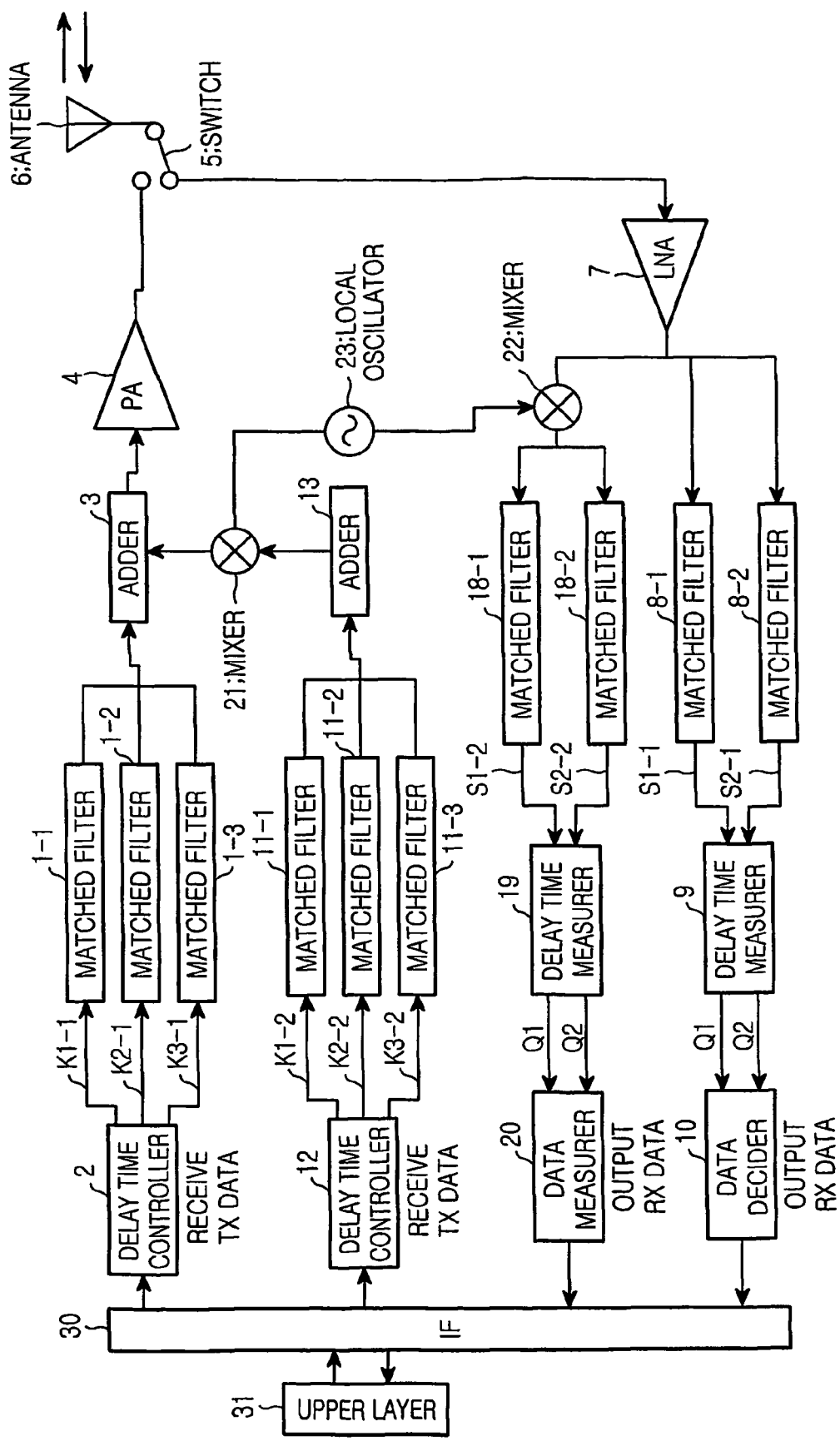
FIG. 29 is a diagram illustrating a structure of an ultra wideband radio transceiver according to a second embodiment of the present invention.
Figure 30:
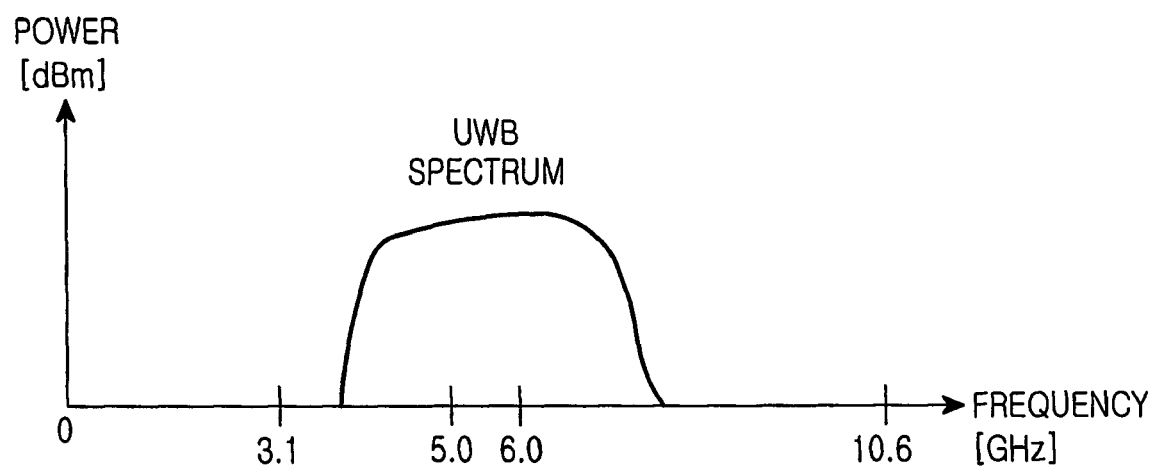
FIG. 30 is a diagram illustrating a UWB spectrum through an existing ultra wideband radio transceiver.
Figure 31:
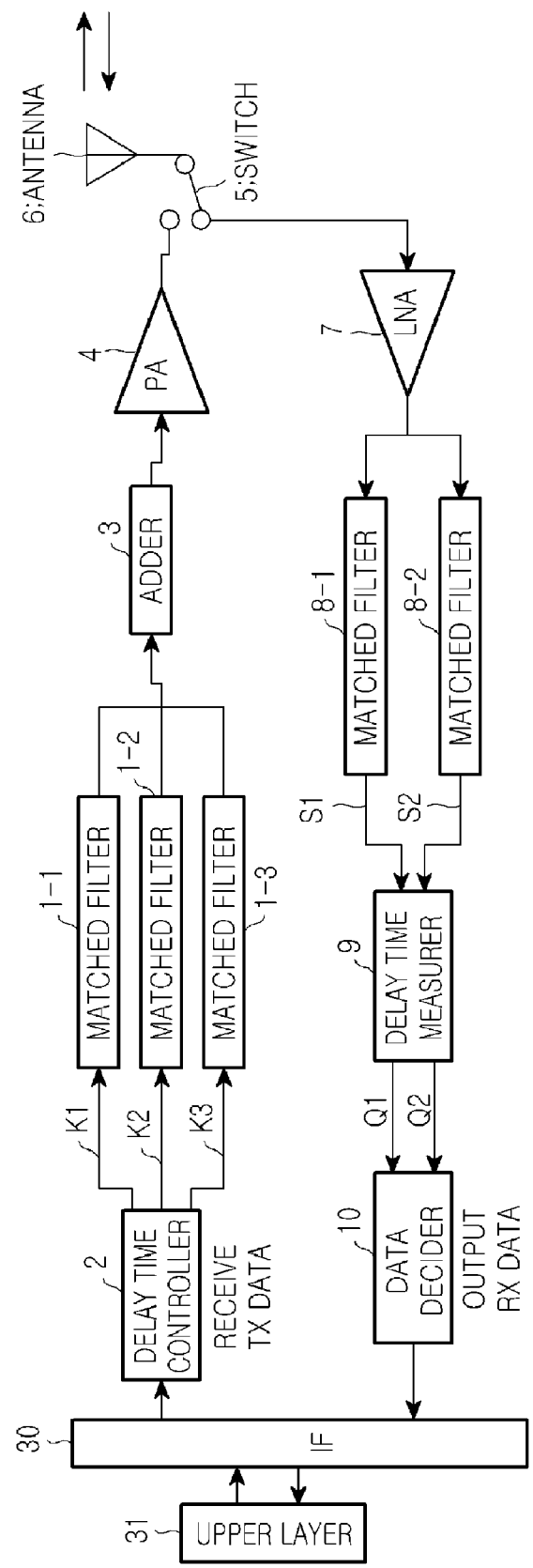
FIG. 31 is a diagram illustrating a structure of an ultra wideband radio transceiver disclosed in Japanese Patent Application No. 2002-262680.

Next, with reference to the drawings, a description will be made of a second embodiment of the ultra wideband radio transceiver applied to the ultra wideband radio transmitter and receiver according to the present invention. FIG. 29 is a diagram illustrating a structure of an ultra wideband radio transceiver according to this embodiment.

The ultra wideband radio transceiver according to this embodiment is different from that of the first embodiment in that PA 4 and PA 14; switch 5 and switch 15; antenna 6 and antenna 16; and LNA 7 and LNA 17 are unified.

Now, a description will be made of only the difference between the ultra wideband radio transceiver according to this embodiment and that of the first embodiment, and a description of the overlapped parts will be omitted for simplicity.

The ultra wideband radio transceiver of FIG. 29 according to this embodiment, like that of the first embodiment, is comprised of first and second transmitters, first and second receivers, an interface (IF) 30, and an upper layer 31.

The first transmitter is comprised of matched filers 1-1 to 1-3, a time delay controller 2, an adder 3, a PA 4, a switch 5, and an antenna 6.

The second transmitter includes a mixer 21 and a local oscillator 23 in addition to the first transmitter. That is, the second transmitter is comprised of matched filers 11-1 to 11-3, a time delay controller 12, an adder 13, the mixer 21, the local oscillator 23, the PA 4 (shared with the first transmitter), the switch 5 (also shared with the first transmitter), and the antenna 6 (also shared with the first transmitter).

The first receiver is comprised of the switch 5 (shared with the first and second transmitters), the antenna 6 (also shared with the first and second transmitters), a LNA 7, matched filters 8-1 and 8-2, a delay time measurer 9, and a data decider 10.

The second receiver includes a mixer 22 and the local oscillator 23 (shared with the second transmitter) in addition to the first receiver. That is, the second receiver is comprised of the switch 5 (shared with the first and second transmitters and the first receiver), the antenna 6 (also shared with the first and second transmitters and the first receiver), the LNA 7 (shared with the first receiver), the mixer 22, the local oscillator 23 (shared with the second transmitter), matched filters 18-1 and 18-2, a delay time measurer 19, and a data decider 20.

A description will now be made of a difference between an operation of the ultra wideband radio transceiver according to this embodiment and that of the first embodiment.

During data transmission, data signals output from the upper layer 31 to the delay time controllers 2 and 12 are added up by the adders 3 and 13 via the matched filters 1-1 to 1-3 and 11-1 to 11-3. An addition signal output from the adder 13 is frequency-converted by the mixer 21 at a high frequency band (e.g., higher than 5 GHz; 6 to 7 GHz) according to a local signal output from the local oscillator 23, and then output to the adder 3.

The adder 3 adds up a addition signal obtained by adding outputs of the matched filters 1-1 to 1-3 and the frequency-converted addition signal output from the matched filters 11-1 to 11-3. This addition signal is amplified through the PA 4, and then radiated by the antenna 6 in the air via the switch 5.

During data reception, a radio signal received at the antenna 6 is input to the LNA 7 via the switch 5. The LNA 7 amplifies this signal, and then outputs the amplified signal to the matched filters 8-1 and 8-2 and the mixer 22.

The amplification signal input to matched filters 8-1 and 8-2 is demodulated by the matched filters 8-1 and 8-2, the delay time measurer 9 and the data decider 10, and then input to the upper layer 31 via the IF 30.

Meanwhile, the amplification signal input to the mixer 22 is frequency-converted at a low frequency band (e.g., lower than 5.5 GHz; 3.5 to 4.5 GHz) according to a local signal output from the local oscillator 23. The frequency-converted amplification signal is input to the matched filers 18-1 and 18-2, demodulated through the matched filers 18-1 and 18-2, the delay time measurer 19 and the data decider 20, and then output to the upper layer 31 as reception data via the IF 30.

Therefore, in the ultra wideband radio transceiver according to this embodiment, the number of parts such as antenna, PA and LNA can be reduced, contributing to miniaturization of a module and a reduction in number of parts.

In the first and second embodiments mentioned above, it has been presented that a communication band is divided into two bands. However, the present invention is not limited to this, but may use three or more bands.

Moreover, in the above-stated first and second embodiments, a PN pattern generated according to each matched filter has two patterns of PN0 and PN1. However, the present invention is not restricted to this, but can use several PN patterns.

In addition, as a method for implementing the patched filter, it is possible to AD-convert a pulse waveform into digital data and then form a transversal filter with a digital circuit in addition to using a SAW device.

Besides, in the foregoing description, the first and second embodiments have been implemented with an analog circuit. However, the present invention is not restricted to this, but can also be implemented with a software radio scheme in which a back-end part of an adder is composed of a digital circuit. In this case, the above-mentioned wideband radio transceiver has a computer system therein. In addition, the above-stated data signal processing procedure is stored in a recording medium capable of being read by a computer, and the procedure is achieved by reading this program by the computer. Here, the computer readable recording medium refers to magnetic disk, optical magnetic disk, CD-ROM, DVD-ROM, semiconductor memory, etc. In addition, this computer program can be allocated to the computer via a communication line, so that the computer can execute the allocated program.

INDUSTRIAL APPLICABILITY

As described hitherto, the present invention provides an ultra wideband radio communication method. In an ultra wideband radio transmitter, a delay time controller generates a periodic pulse, inputs the periodic pulse to a first matched filter, outputs the periodic pulse to a second matched filter when transmission data has a first level out of 2 logical levels, and outputs the periodic pulse to a third matched filter when the transmission data has a second level out of 2 logical levels; the first matched filter outputs a reference signal that becomes a data decision criterion when the periodic pulse is input thereto; the second matched filter outputs a first data signal a predetermined time ahead of the reference signal when the periodic pulse is input thereto; the third matched filter outputs a second data signal a predetermined time behind the reference signal when the periodic pulse is input thereto; an adder adds up outputs of the first to third matched filters; a local oscillator outputs a local signal for frequency-converting a corresponding addition signal at a high frequency band or a low frequency band; a mixer receives the addition signal and the local signal, and frequency-converts the addition signal; and an antenna receives the frequency-converted addition signal, and radiates the corresponding signal in the air; and in an ultra wideband radio receiver, an antenna receives the addition signal and outputs the corresponding signal to a mixer; the mixer receives the addition signal and a local signal that a local oscillator outputs to frequency-convert the addition signal, and frequency-converts the addition signal; a fourth matched filter receives the frequency-converted radio wave signal, and outputs a first output signal when a reference signal that becomes a data decision criterion is detected therefrom; a fifth matched filter receives the frequency-converted radio wave signal, and outputs a second output signal when a data signal is detected therefrom; a delay time measurer detects which of the first output signal and the second output signal has been first output from the fourth and fifth matched filters, and outputs a corresponding detection result; and a data decider receives the detection result, and decides whether the data signal has a first level or a second level out of 2 logical levels. As a result, it is possible to secure higher transfer rate and communication quality than conventional ones while avoiding a band where communication signals are densely concentrated, and also to miniaturize an antenna.

What is claimed is:

1. An ultra wideband radio transmitter comprising:
    a delay time controller for generating a periodic pulse, inputting the periodic pulse to a first matched filter, outputting the periodic pulse to a second matched filter when transmission data has a first level out of 2 logical levels, outputting the periodic pulse to a third matched filter when the transmission data has a second level out of the 2 logical levels;
    the first matched filter for outputting a reference signal that becomes a data decision criterion when the periodic pulse is input thereto;
    the second matched filter for outputting a first data signal a predetermined time ahead of the reference signal when the periodic pulse is input thereto;
    the third matched filter for outputting a second data signal a predetermined time behind the reference signal when the periodic pulse is input thereto;
    an adder for adding up outputs of the first to third matched filters;
    a local oscillator for outputting a local signal for frequency-converting an addition signal of the adder at a high frequency band or a low frequency band;
    a mixer for receiving the addition signal and the local signal, and frequency-converting the addition signal; and
    an antenna for receiving the frequency-converted addition signal and radiating the frequency-converted addition signal in the air.

2. The ultra wideband radio transmitter of claim 1, wherein the reference signal, the first data signal, and the second data signal each are a pattern signal comprised of several periodic pulses.

3. An ultra wideband radio receiver comprising:
   an antenna for receiving a radio wave signal;
   a local oscillator for outputting a local signal for frequency-converting the radio wave signal;
   a mixer for receiving the radio wave signal and the local signal, and frequency-converting the radio wave signal;
   a first matched filter for receiving the frequency-converted radio wave signal, and outputting a first output signal when a reference signal that becomes a data decision criterion is detected therefrom;
   a second matched filter for receiving the frequency-converted radio wave signal, and outputting a second output signal when a data signal is detected therefrom;
   a delay time measurer for detecting which of the first output signal and the second output signal has been first output from the first and second matched filters, and outputting a corresponding detection result; and
   a data decider for receiving the detection result and deciding whether the data signal has a first level or a second level out of 2 logical levels;
   wherein the delay time measurer comprises:
      a first circuit for receiving the first output signal and calculating a square value or an absolute value of the first output signal,
      a second circuit for receiving the second output signal and calculating a square value or an absolute value of the second output signal,
      a first latch for receiving and setting an output signal of the first circuit,
      a second latch for receiving and setting an output signal of the second circuit,
      a first memory for reading an output signal of the first latch as the detection result by receiving an output signal of the second latch,
      a second memory for reading the output signal of the second latch as the detection result by receiving the output signal of the first latch, and
      a reset section for outputting a reset signal by receiving the output signal of the first latch.

4. The ultra wideband radio receiver of claim 3, wherein the reference signal and the data signal each are a pattern signal comprising several periodic pulses.

5. An ultra wideband radio transmitter comprising a first radio section for performing data communication using a first frequency, a second radio section for performing data communication using a second frequency being different from the first frequency, and an interface section for allocating transmission data to the first and second radio sections, the transmitter comprising:
   the first radio section comprising:
      a first delay time controller for generating a periodic pulse by receiving transmission data allocated by the interface, inputting the periodic pulse to a first matched filter, outputting the periodic pulse to a second matched filter when the transmission data has a first level out of 2 logical levels, and outputting the periodic pulse to a third matched filter when the transmission data has a second level out of the 2 logical levels,
      the first matched filter for outputting a reference signal that becomes a data decision criterion when the periodic pulse is input thereto,
      the second matched filter for outputting a first data signal a predetermined time ahead of the reference signal when the periodic signal is input thereto,
      the third matched filter for outputting a second data signal a predetermined time behind the reference signal when the periodic pulse is input thereto,
      a first adder for adding up outputs of the first to third matched filters, and
      a first antenna for receiving a first addition signal of the first adder and radiating the first addition signal in the air; and
   the second radio section comprising:
      a second delay time controller for generating a periodic pulse by receiving transmission data allocated by the interface, inputting the periodic pulse to a fourth matched filter, outputting the periodic pulse to a fifth matched filter when the transmission data has a first level out of 2 logical levels, and outputting the periodic pulse to a sixth matched filter when the transmission data has a second level out of the 2 logical levels,
      the fourth matched filter for outputting a reference signal that becomes a data decision criterion when the periodic pulse is input thereto,
      the fifth matched filter for outputting a first data signal a predetermined time ahead of the reference signal when the periodic signal is input thereto,
      the sixth matched filter for outputting a second data signal a predetermined time behind the reference signal when the periodic pulse is input thereto,
      a second adder for adding up outputs of the fourth to sixth matched filters,
      a local oscillator for outputting a local signal for frequency-converting a second addition signal of the second adder,
      a mixer for receiving the second addition signal and the local signal, and frequency-converting the second addition signal, and
      an antenna for receiving the frequency-converted second addition signal and radiating the frequency-converted second addition signal in the air.

6. An ultra wideband radio receiver comprising a first radio section for performing data communication using a first frequency, and a second radio section for performing data communication using a second frequency being different from the first frequency, the receiver comprising:
   the first radio section comprising:
      a first antenna for receiving a radio wave signal and outputting the radio wave signal to a first matched filter and a second matched filter,
      the first matched filter for receiving the radio wave signal from the first antenna, and outputting a first output signal when a reference signal that becomes a data decision criterion is detected therefrom,
      the second matched filter for receiving the radio wave signal from the first antenna, and outputting a second output signal when a data signal is detected therefrom,
      a first delay time measurer for detecting which of the first output signal and the second output signal has been first output from the first and second matched filters, and outputting a corresponding first detection result, and
      a first data decider for receiving the first detection result, and deciding whether the data signal has a first level or a second level out of 2 logical levels; and the second radio section comprising:
- a second antenna for receiving a radio wave signal,
- a local oscillator for outputting a local signal for frequency-converting the radio wave signal,
- a mixer for receiving the radio wave signal and the local signal, and frequency-converting the radio wave signal,
- a third matched filter for receiving the frequency-converted radio wave signal, and outputting a third output signal when a reference signal that becomes a data decision criterion is detected therefrom,
- a fourth matched filter for receiving the frequency-converted radio wave signal, and outputting a fourth output signal when a data signal is detected therefrom,
- a second delay time measurer for detecting which of the third output signal and the fourth output signal has first been output from the third and fourth matched filters, and outputting a corresponding second detection result, and
- a second data decider for receiving the second detection result, and deciding whether the data signal has a first level or a second level out of 2 logical levels;

wherein the first delay time measurer comprises:
- a first circuit for receiving the first output signal and calculating a square value or an absolute value of the first output signal,
- a second circuit for receiving the second output signal and calculating a square value or an absolute value of the second output signal,
- a first latch for receiving and setting an output signal of the first circuit,
- a second latch for receiving and setting an output signal of the second circuit,
- a first memory for reading an output signal of the first latch as the first detection result by receiving an output signal of the second latch,
- a second memory for reading the output signal of the second latch as the first detection result by receiving the output signal of the first latch, and
- a reset section for outputting a reset signal by receiving the output signal of the first latch; and/or wherein the second delay time measurer comprises:
- a third circuit for receiving the third output signal and calculating a square value or an absolute value of the third output signal,
- a fourth circuit for receiving the fourth output signal and calculating a square value or an absolute value of the fourth output signal,
- a third latch for receiving and setting an output signal of the third circuit,
- a fourth latch for receiving and setting an output signal of the fourth circuit,
- a third memory for reading an output signal of the third latch as the second detection result by receiving an output signal of the fourth latch,
- a fourth memory for reading the output signal of the fourth latch as the second detection result by receiving the output signal of the third latch, and
- a reset section for outputting a reset signal by receiving the output signal of the third latch.

7. An ultra wideband radio transmitter comprising a first radio section for performing data communication using a first frequency, a second radio section for performing data communication using a second frequency being different from the first frequency, and an interface for allocating transmission data to the first and second radio sections, the transmitter comprising:

the first radio section comprising:
- a first delay time controller for generating a periodic pulse by receiving transmission data allocated by the interface, inputting the periodic pulse to a first matched filter, outputting the periodic pulse to a second matched filter when the transmission data has a first level out of 2 logical levels, and outputting the periodic pulse to a third matched filter when the transmission data has a second level of the 2 logical levels,
- the first matched filter for outputting a reference signal that becomes a data decision criterion when the periodic pulse is input thereto,
- the second matched filter for outputting a first data signal a predetermined time ahead of the reference signal when the periodic pulse is input thereto,
- the third matched filter for outputting a second data signal a predetermined time behind the reference signal when the periodic pulse is input thereto,
- a first adder for adding up outputs of the first to third matched filters, and
- an antenna for receiving a first addition signal of the first adder, and radiating the first addition signal in the air; and the second radio section comprising:
- a second delay time controller for generating a periodic pulse by receiving transmission data allocated by the interface, inputting the periodic pulse to a fourth matched filter, outputting the periodic pulse to a fifth matched filter when the transmission data has a first level out of 2 logical levels, and outputting the periodic pulse to a sixth matched filter when the transmission data has a second level of the 2 logical levels,
- the fourth matched filter for outputting a reference signal that becomes a data decision criterion when the periodic pulse is input thereto,
- the fifth matched filter for outputting a first data signal a predetermined time ahead of the reference signal when the periodic pulse is input thereto,
- the sixth matched filter for outputting a second data signal a predetermined time behind the reference signal when the periodic pulse is input thereto,
- a second adder for adding up outputs of the fourth to sixth matched filters,
- a local oscillator for outputting a local signal for frequency-converting a second addition signal of the second adder from the first frequency to the second frequency, and
- a mixer for receiving the second addition signal and the local signal, frequency-converting the second addition signal, and outputting the frequency-converted second addition signal to the antenna.

8. An ultra wideband radio receiver comprising a first radio section for performing data communication using a first frequency, and a second radio section for performing data communication using a second frequency being different from the first frequency, the receiver comprising:

the first radio section comprising:
- an antenna for receiving a radio wave signal and outputting the radio wave signal to a first matched filter, a second matched filter, and a mixer in the second radio section,
- the first matched filter for receiving the radio wave signal from the antenna, and outputting a first output signal when a reference signal that becomes a data decision criterion is detected therefrom, the second matched filter for receiving the radio wave signal from the antenna, and outputting a second output signal when a data signal is detected therefrom, a first delay time measurer for detecting which of the first output signal and the second output signal has been first output from the first and second matched filters, and outputting a corresponding first detection result, and a first data decider for receiving the first detection result, and deciding whether the data signal has a first level or a second level out of 2 logical levels; and the second radio section comprising:

a local oscillator for outputting a local signal for frequency-converting the radio wave signal received from the antenna, a mixer for receiving the radio wave signal from the antenna and the local signal, and frequency-converting the radio wave signal, a third matched filter for receiving the frequency-converted radio wave signal, and outputting a third output signal when a reference signal that becomes a data decision criterion is detected therefrom, a fourth matched filter for receiving the frequency-converted radio wave signal, and outputting a fourth output signal when a data signal is detected therefrom, a second delay time measurer for detecting which of the third output signal and the fourth output signal has first been output from the third and fourth matched filters, and outputting a corresponding second detection result, and a second data decider for receiving the second detection result, and deciding whether the data signal has a first level or a second level out of 2 logical levels;

wherein the first delay time measurer comprises:

a first circuit for receiving the first output signal and calculating a square value or an absolute value of the first output signal, a second circuit for receiving the second output signal and calculating a square value or an absolute value of the second output signal, a first latch for receiving and setting an output signal of the first circuit, a second latch for receiving and setting an output signal of the second circuit, a first memory for reading an output signal of the first latch as the first detection result by receiving an output signal of the second latch, a second memory for reading the output signal of the second latch as the first detection result by receiving the output signal of the first latch, and a reset section for outputting a reset signal by receiving the output signal of the first latch; and/or wherein the second delay time measurer comprises:

a third circuit for receiving the third output signal and calculating a square value or an absolute value of the third output signal, a fourth circuit for receiving the fourth output signal and calculating a square value or an absolute value of the fourth output signal, a third latch for receiving and setting an output signal of the third circuit, a fourth latch for receiving and setting an output signal of the fourth circuit, a third memory for reading an output signal of the third latch as the second detection result by receiving an output signal of the fourth latch, a fourth memory for reading the output signal of the fourth latch as the second detection result by receiving the output signal of the third latch, and a reset section for outputting a reset signal by receiving the output signal of the third latch.

9. An ultra wideband radio communication system comprising:

an ultrawideband radio transmitter comprising:

a delay time controller which generates a periodic pulse, inputs the periodic pulse to a first matched filter, outputs the periodic pulse to a second matched filter when transmission data has a first level out of 2 logical levels, and outputs the periodic pulse to a third matched filter when the transmission data has a second level out of 2 logical levels;

the first matched filter which outputs a reference signal that becomes a data decision criterion when the periodic pulse is input thereto;

the second matched filter which outputs a first data signal a predetermined time ahead of the reference signal when the periodic pulse is input thereto;

the third matched filter which outputs a second data signal a predetermined time behind the reference signal when the periodic pulse is input thereto;

an adder which adds up outputs of the first to third matched filters; p2 a local oscillator which outputs a local signal for frequency-converting a corresponding addition signal at a high frequency band or a low frequency band;

a mixer which receives the addition signal and the local signal, and frequency-converts the addition signal; and an antenna which receives the frequency-converted addition signal, and radiates the corresponding signal in the air; and an ultra wideband radio receiver comprising:

an antenna which receives a radio wave signal and outputs the radio wave signal to a second mixer;

the second mixer which receives the radio wave signal and a local signal that a local oscillator outputs to frequency-convert the radio wave signal, and frequency-converts the radio wave signal;

a fourth matched filter which receives the frequency-converted radio wave signal, and outputs a first output signal when a reference signal that becomes a data decision criterion is detected therefrom;

a fifth matched filter which receives the frequency-converted radio wave signal, and outputs a second output signal when a data signal is detected therefrom;

a delay time measurer which detects which of the first output signal and the second output signal has been first output from the fourth and fifth matched filters, and outputs a corresponding detection result; and a data decider which receives the detection result, and decides whether the data signal has a first level or a second level out of 2 logical levels;

wherein the delay time measurer comprises:

a first circuit for receiving the first output signal and calculating a square value or an absolute value of the first output signal, a second circuit for receiving the second output signal and calculating a square value or an absolute value of the second output signal, a first latch for receiving and setting an output signal of the first circuit, a second latch for receiving and setting an output signal of the second circuit, a first memory for reading an output signal of the first latch as the detection result by receiving an output signal of the second latch, a second memory for reading the output signal of the second latch as the detection result by receiving the output signal of the first latch, and a reset section for outputting a reset signal by receiving the output signal of the first latch.

* * * * *